US012634169B2

(12) United States Patent
Kang et al.

(10) Patent No.: US 12,634,169 B2
(45) Date of Patent: May 19, 2026

(54) METHOD AND APPARATUS FOR DETECTING USER DATA OF ACTIVATED USER USING PILOT AND DATA IN A GRANT-FREE WIRELESS COMMUNICATION SYSTEM

(71) Applicant: Korea University Research and Business Foundation, Seoul (KR)

(72) Inventors: Chung Gu Kang, Seoul (KR); Min-Sig Han, Seongnam-si (KR)

(73) Assignee: Korea University Research and Business Foundation, Seoul (KR)

( * ) Notice: Subject to any disclaimer, the term of this patent is extended or adjusted under 35 U.S.C. 154(b) by 683 days.

(21) Appl. No.: 18/087,856

(22) Filed: Dec. 23, 2022

(65) Prior Publication Data

US 2023/0412427 A1      Dec. 21, 2023

(30) Foreign Application Priority Data

Jun. 20, 2022      (KR) ........................ 10-2022-0074982

(51) Int. Cl.
*H04L 25/02* (2006.01)
*H04L 5/00* (2006.01)
*H04W 72/115* (2023.01)

(52) U.S. Cl.
CPC ........ *H04L 25/0204* (2013.01); *H04L 5/0051* (2013.01); *H04W 72/115* (2023.01)

(58) Field of Classification Search
CPC ... H04J 99/00; H04W 72/115; H04L 25/0204; H04L 5/0051; H04L 1/0048; H04L 25/0224; H04L 25/0254; H04L 25/03898
See application file for complete search history.

(56) References Cited

U.S. PATENT DOCUMENTS

| 12,231,269 | B2* | 2/2025 | Shim ................... H04L 25/0254 |
| 2006/0093065 | A1* | 5/2006 | Thomas .............. H04L 25/0204 |
| | | | 375/299 |

(Continued)

FOREIGN PATENT DOCUMENTS

| KR | 10-2021-0044635 | | 4/2021 |
| KR | 10-2022-0074228 | A | 6/2022 |

OTHER PUBLICATIONS

Durak, Mehmet Hakan, et al, "Dynamic and Sparsity Adaptive Compressed Sensing Based Active User Detection and Channel Estimation of Uplink Grant-Free SCMA." Radioengineering 30.3 (2021)., (8 pages).

(Continued)

*Primary Examiner* — Ayman A Abaza
*Assistant Examiner* — Hooman Houshmand
(74) *Attorney, Agent, or Firm* — NSIP Law

(57)      ABSTRACT

A method performed by a base station of a wireless communication system including: a step to transmit a codebook allocated to individual user terminals for data transmission; a step to receive a pilot and data from the user terminals; a step to generate an active user information based on the data; a step to detect an active user terminal among the user terminals based on the pilot and the active user information; a step to generate a channel estimation information related to the active user terminal; and a step to detect the data of the active user terminal based on the channel estimation information.

16 Claims, 15 Drawing Sheets

(56) References Cited

U.S. PATENT DOCUMENTS

| | | | | |
|---|---|---|---|---|
| 2010/0254473 | A1* | 10/2010 | Wu | H04L 25/03343 375/267 |
| 2021/0111772 | A1* | 4/2021 | Lee | H04B 7/0456 |
| 2021/0250068 | A1* | 8/2021 | Lee | H04B 7/0456 |
| 2021/0410135 | A1* | 12/2021 | Yu | G06N 3/04 |
| 2023/0412429 | A1* | 12/2023 | Shim | H04L 25/0254 |

OTHER PUBLICATIONS

Korean Office Action issued on Jun. 20, 2024, in counterpart Korean Patent Application No. 10-2022-0074982 (5 pages in English, 5 pages in Korean).

Han, Minsig, Ameha T. Abebe, and Chung G. Kang. "Data-aided Active User Detection with a User Activity Extraction Network for Grant-free SCMA Systems." *arXiv preprint arXiv:*2205.10780 (May 22, 2022) 6 pages.

* cited by examiner

【Fig. 1】
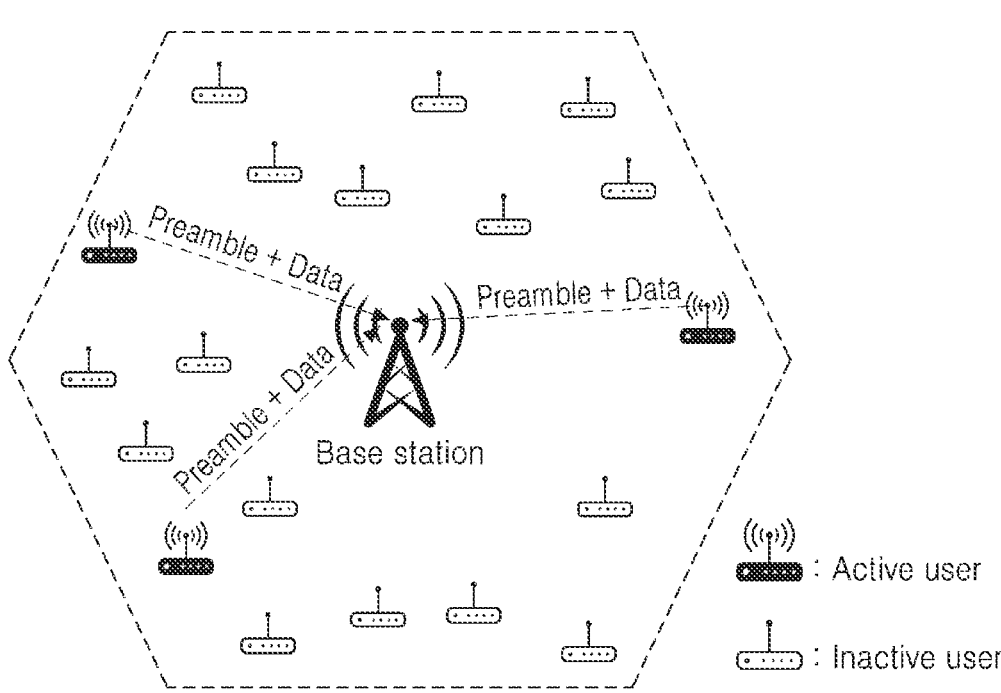

[Fig. 2]

[Fig. 3]
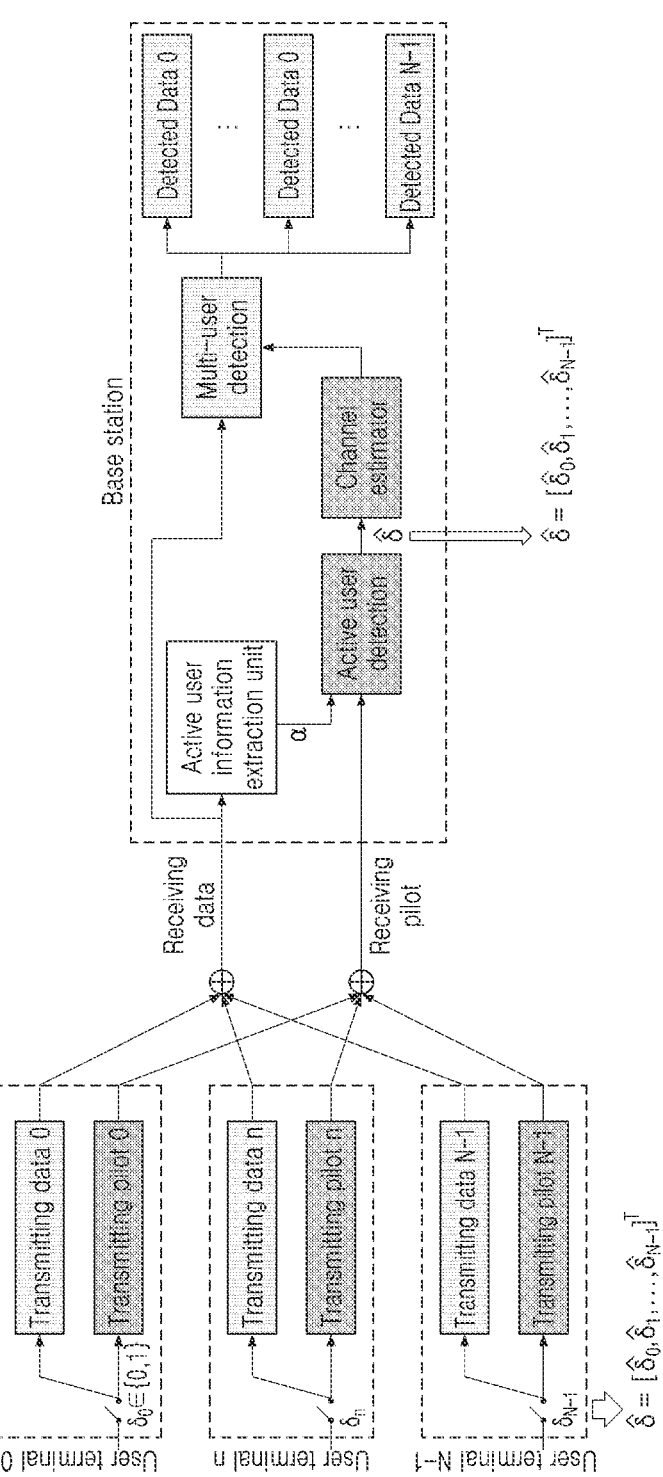

[Fig. 4]

【Fig. 5】
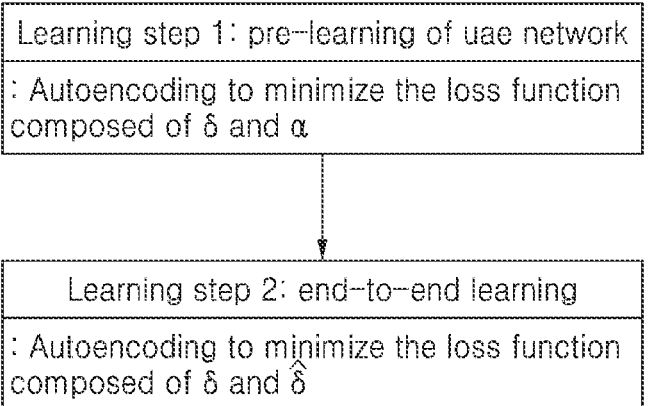
【Fig. 6】
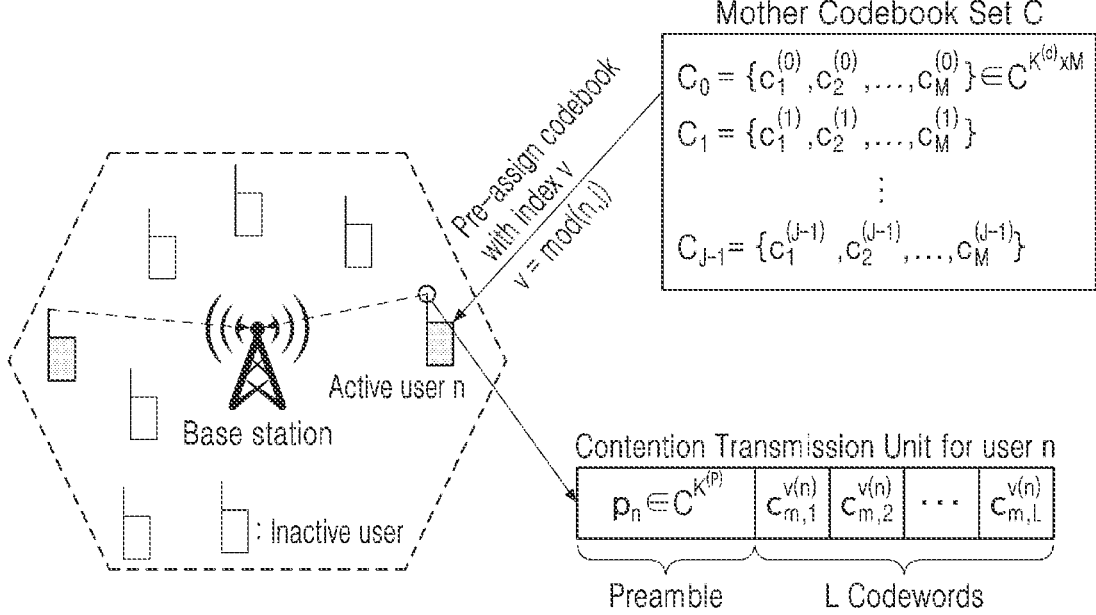

[Fig. 7]

[Fig. 8]
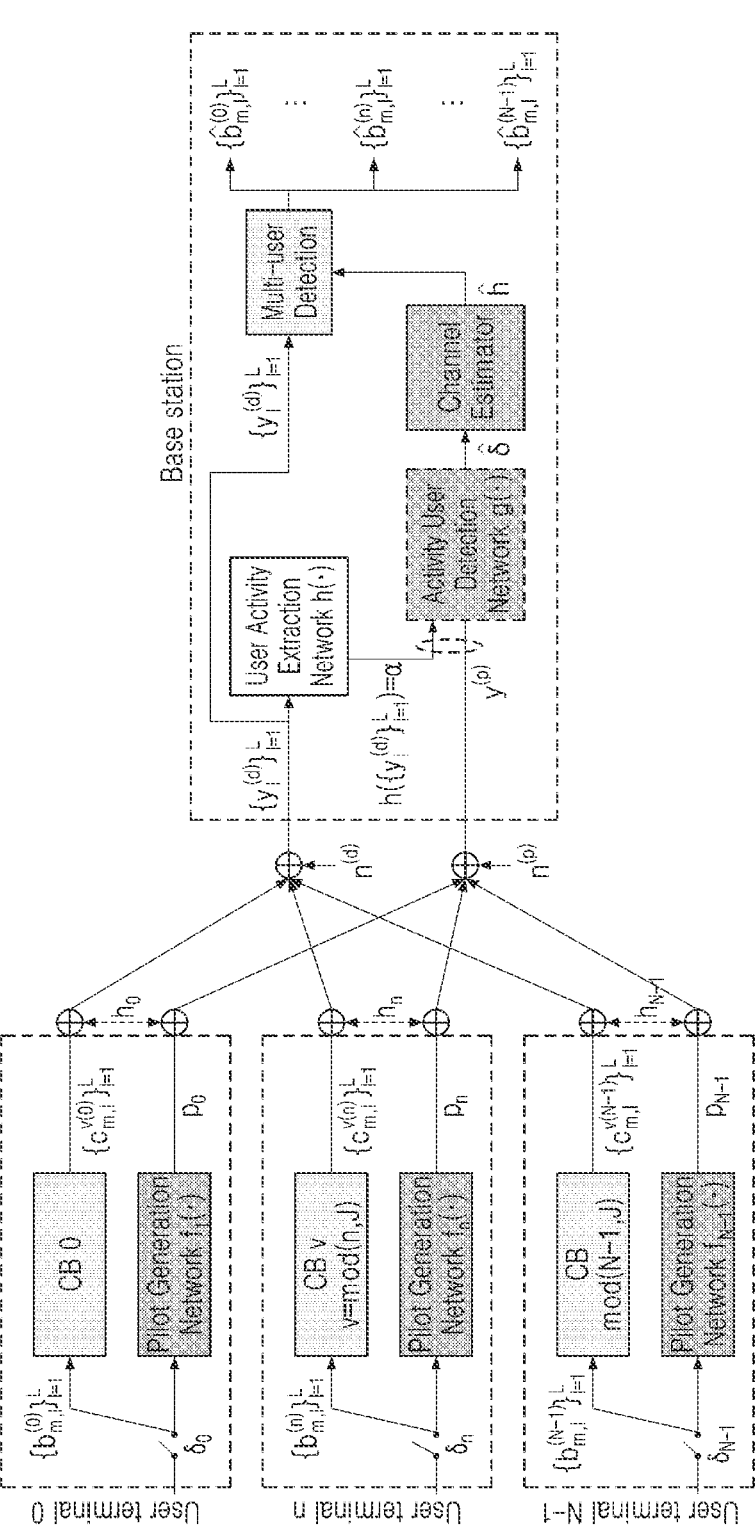

【Fig. 9】
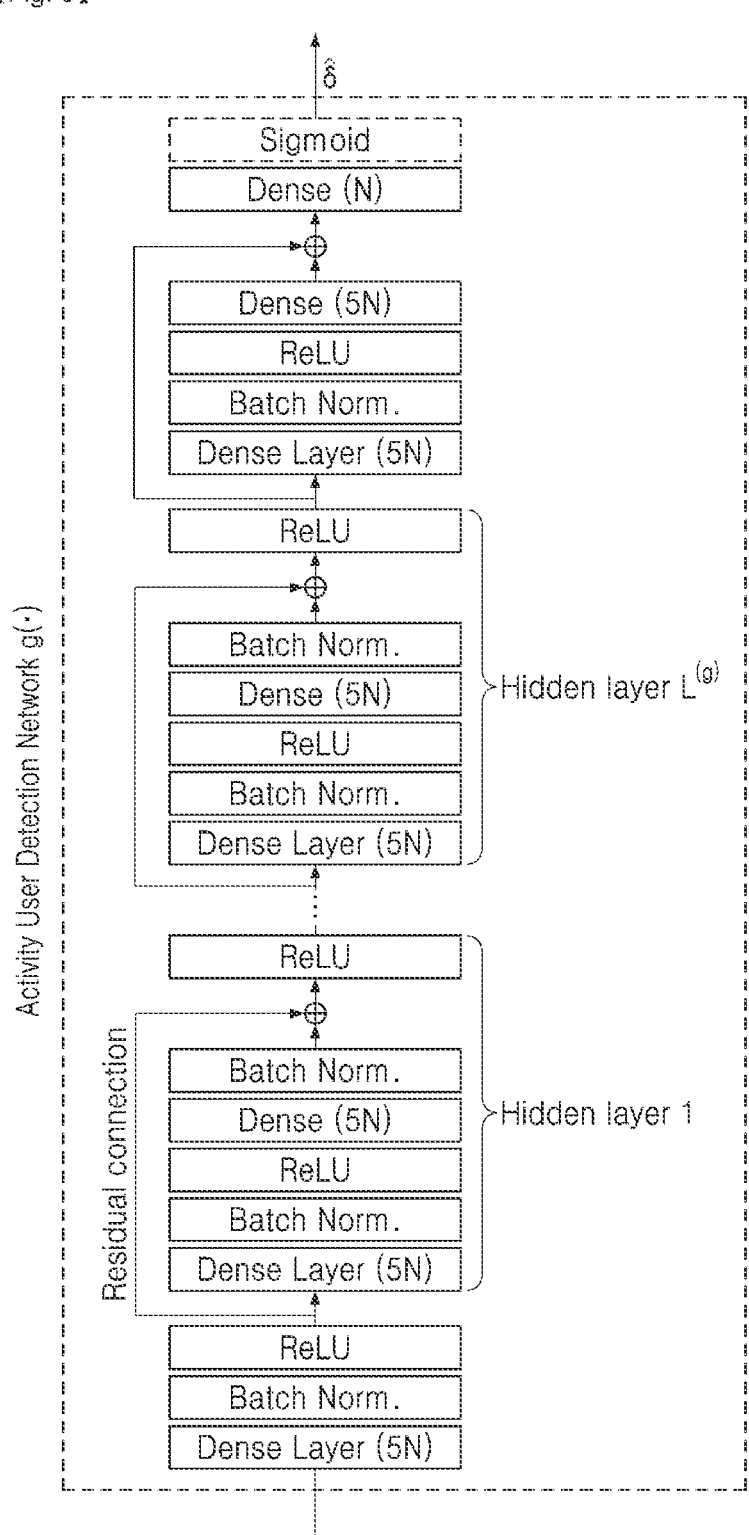

【Fig. 10】
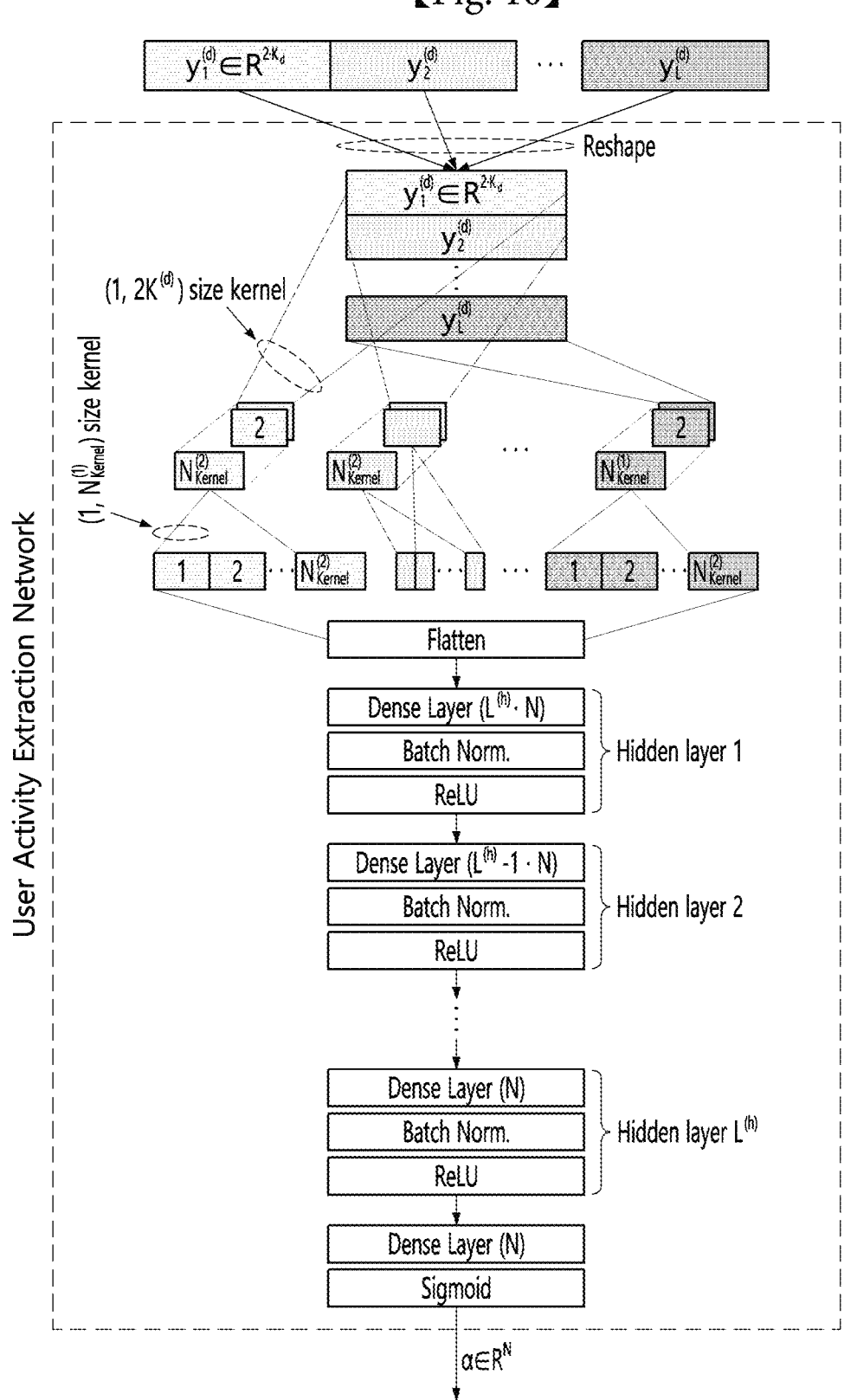

[Fig. 11a]
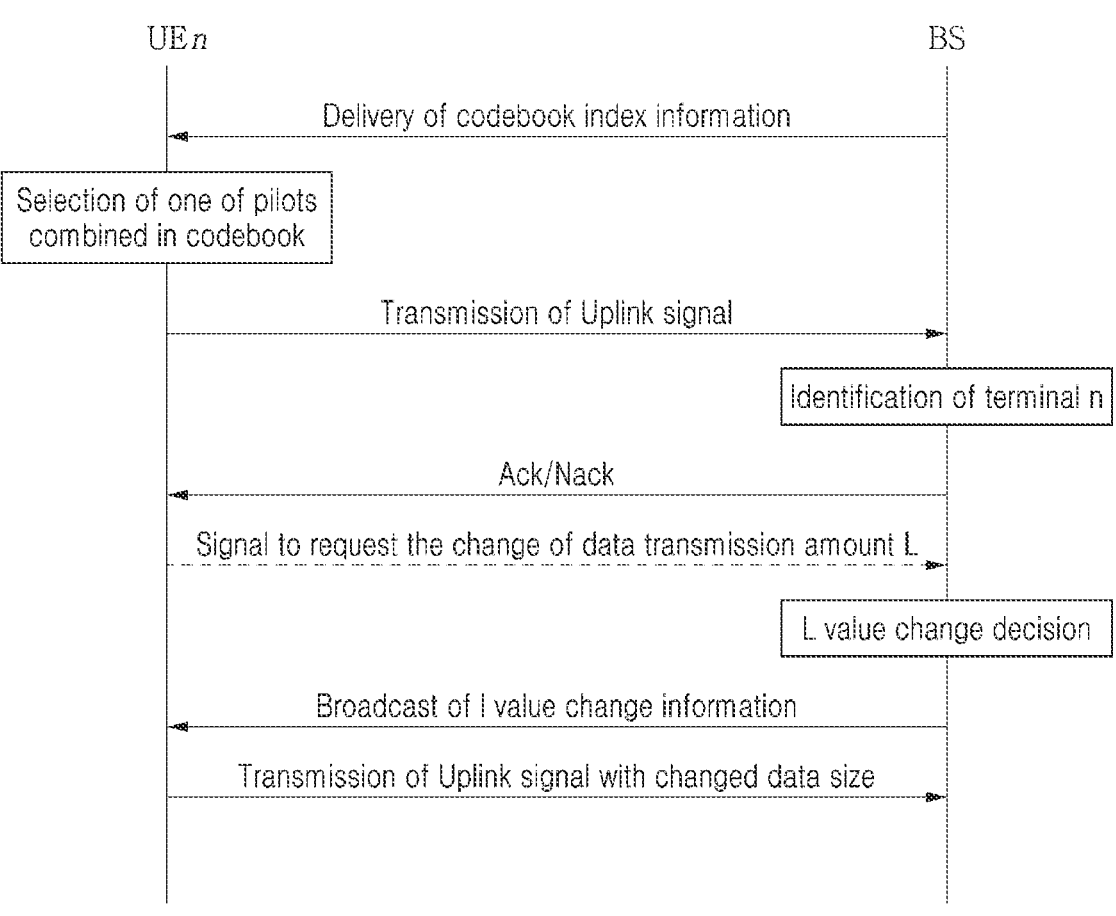

〖Fig. 11b〗
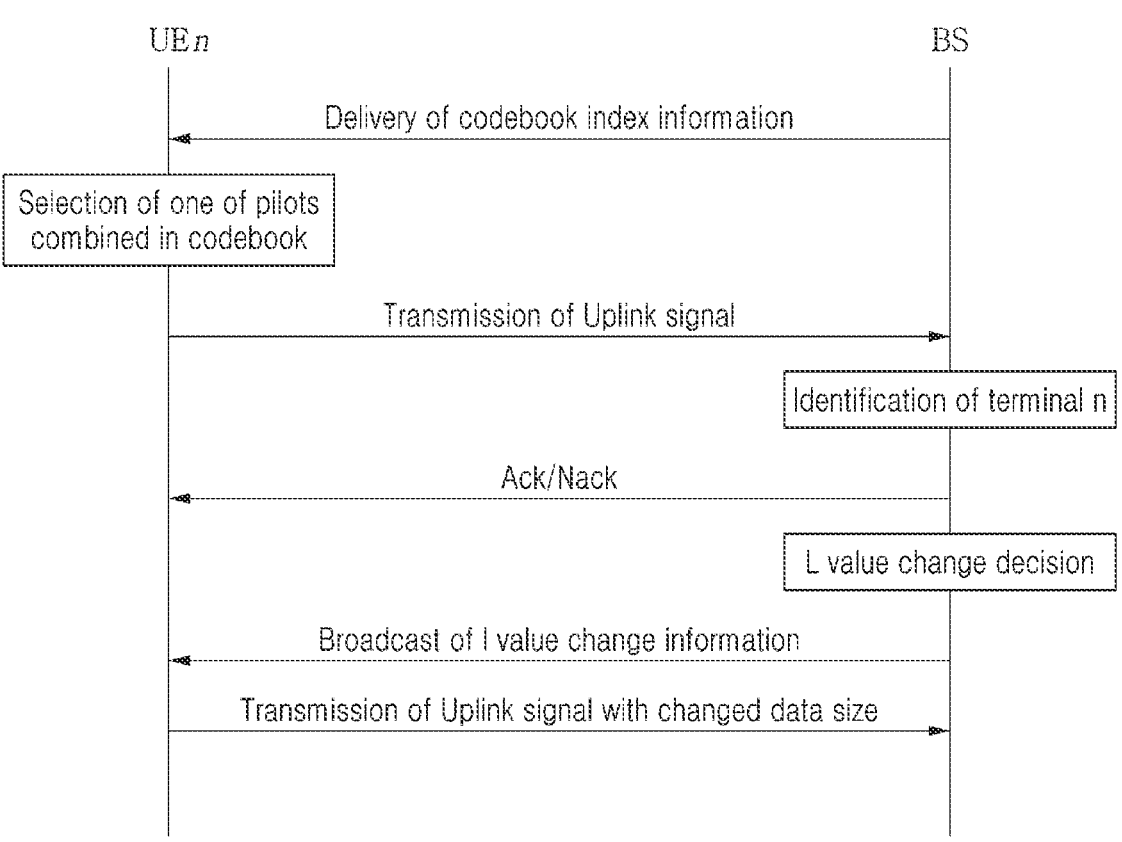

【Fig. 12】
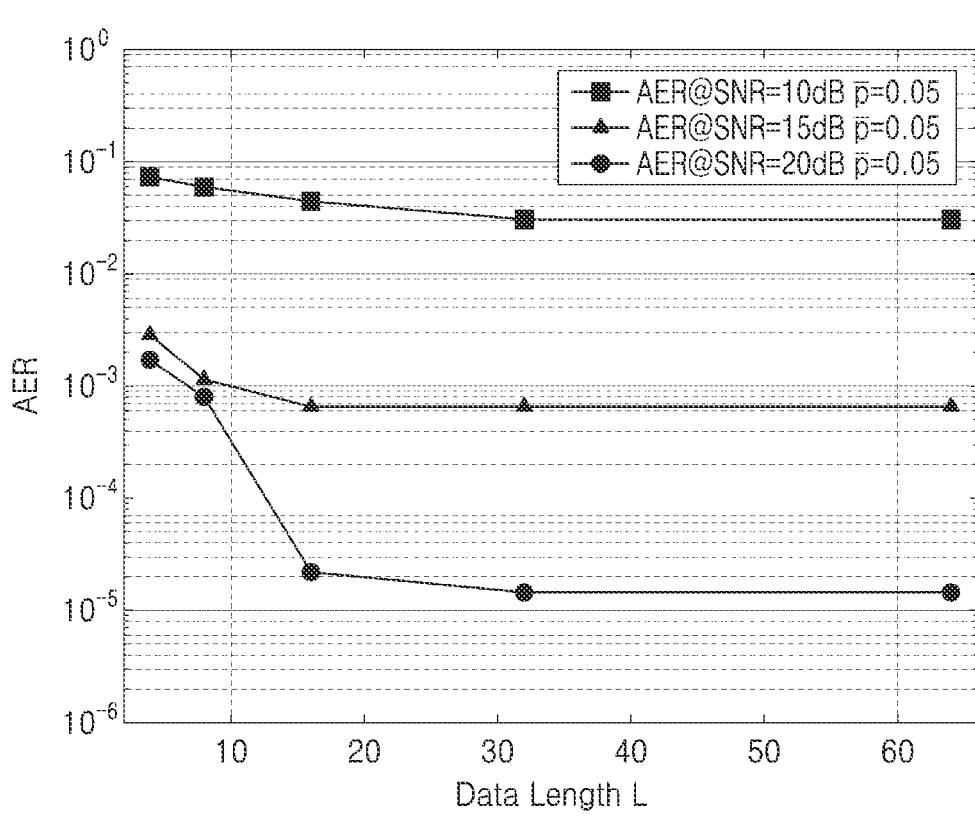

【Fig. 13】
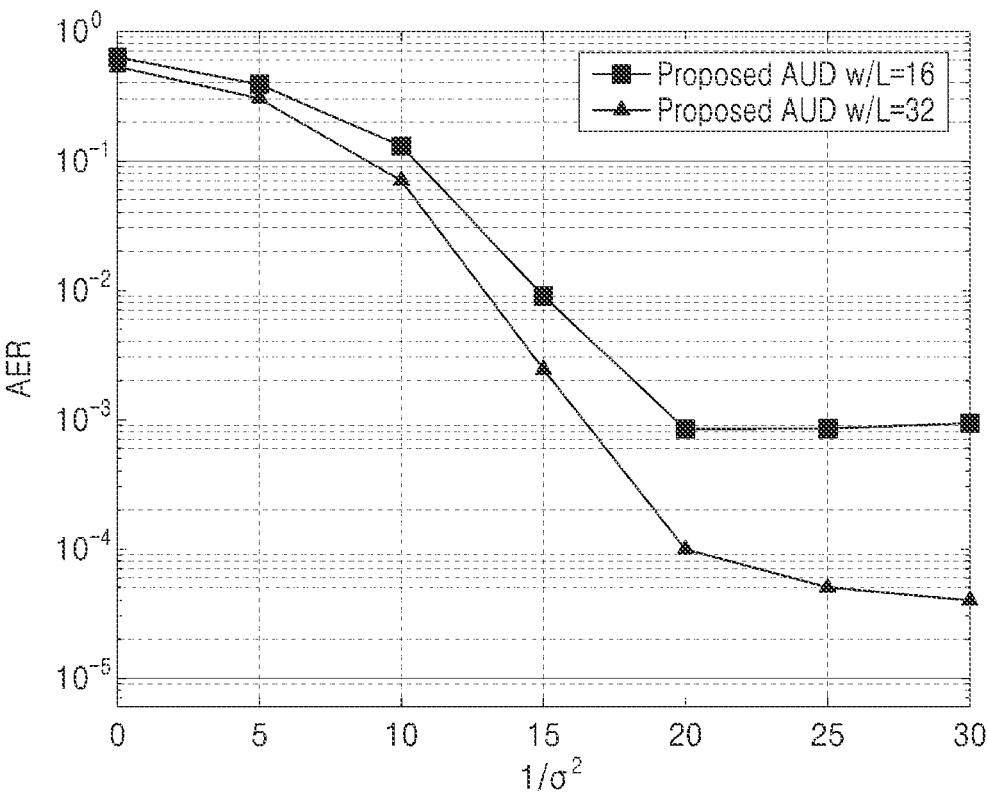

[Fig. 14]
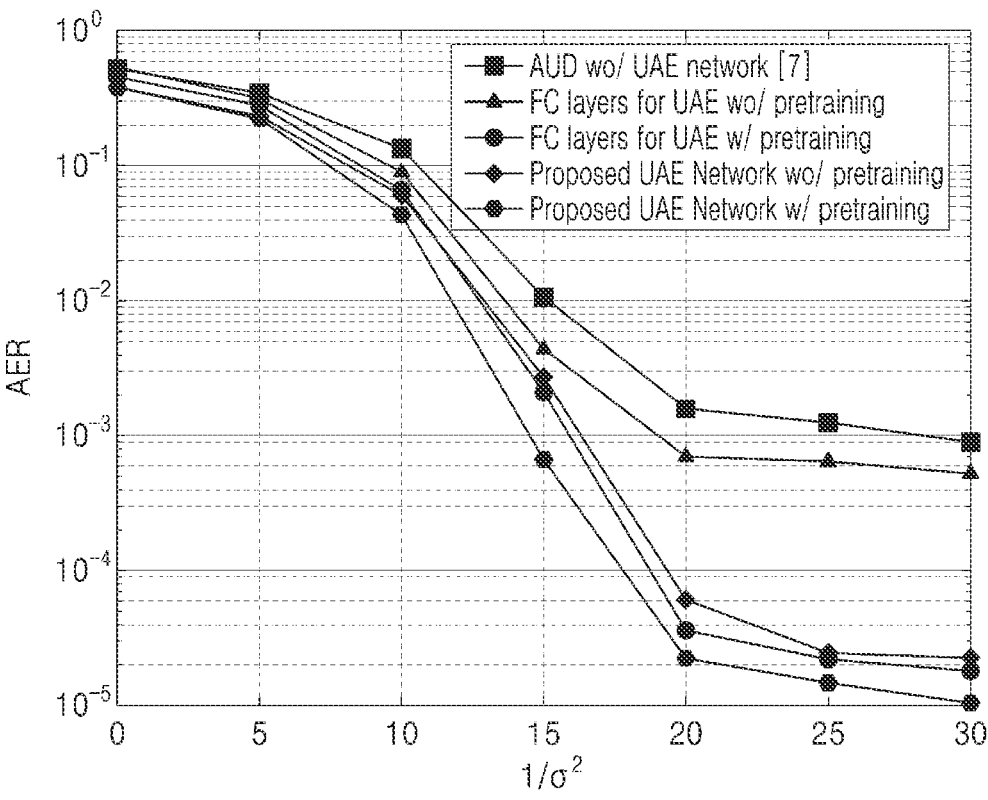

[Fig. 15]
1400
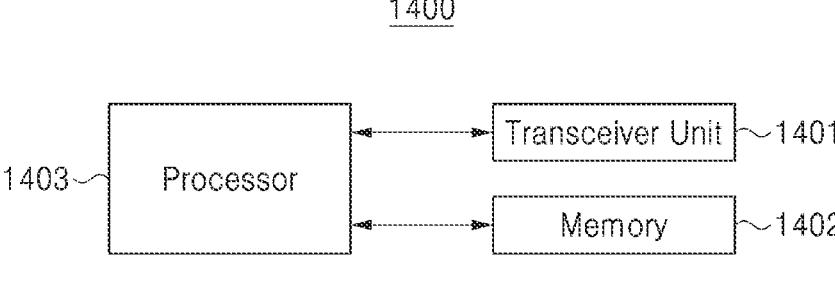
[Fig. 16]
1500
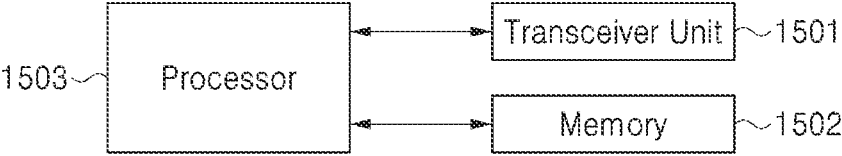

METHOD AND APPARATUS FOR DETECTING USER DATA OF ACTIVATED USER USING PILOT AND DATA IN A GRANT-FREE WIRELESS COMMUNICATION SYSTEM

CROSS-REFERENCE TO RELATED APPLICATION

This application claims priority under 35 U.S.C. § 119(a) to Korean Patent Application No. 10-2022-0074982 filed on Jun. 20, 2022, in the Korean Intellectual Property Office, the disclosure of which is incorporated herein by reference in its entirety.

TECHNICAL FIELD

This invention relates to a wireless communication system; more in detail, it deals with a method and apparatus which performs the active user detection (AUD) by utilizing the user data as well as the pilot when a user data symbol and a pilot symbol are transmitted at one time in an uplink grant-free multiple access situation through non-orthogonal multiple access.

TECHNOLOGY BEHIND THE INVENTION

This invention considers a Massive IoT system in which multiple Internet-of-things (IoT) sensors (devices or users) are simultaneously accessed through uplink. In the existing 4G mobile communication standard, in order for multiple IoT devices to simultaneously transmit the data through uplink, each user had to make a reservation to receive a grant of uplink resource necessary for data transmission. However, since these IoT devices have a relatively small amount of transmission data, it is very inefficient to individually reserve and allocate resources to multiple IoT users because it requires a lot of signal load for the reservation and resource allocation process compared to the amount of transmission data. Accordingly, the grant-free multiple access in which the data and the pilot symbols are transmitted together without a separate reservation can be considered for the systems in which multiple devices are accessed at the same time.

One of the grant-free communication system's characteristics different from the existing reservation communication system is that the base station does not know in advance which user will transmit the data because no procedure to reserve and allocate the resource is not performed in advance between the base station and the user. In other words, in the existing reservation-based communication system, the base station can know in advance which user will transmit the data or which user is active but, in the grant-free communication system, the base station cannot know which one among the multiple users will transmit the data in advance. Therefore, in the grant-free system, the base station needs to detect an active user who has transmitted the corresponding data symbol before detecting the data symbol. The method of detecting the data symbols in a situation where an active user is not known in advance is called a blind detection method, and the procedure to identify the active user prior to blind detection is an active user detection (AUD). If the base station successfully performs the AUD procedure in the grant-free multiple access system, the base station comes to know which user is active, so it can perform subsequent channel estimation and data reception procedures based on this. As such, the performance of the AUD procedure affects the channel estimation performance for active users, and this channel estimation performance has a significant effect on the data detection performance for active users. Therefore, this invention proposes a method and an apparatus for improving the AUD performance in order to increase the data detection performance in grant-free transmission situations of multiple IoT devices.

CONTENTS OF INVENTION

Tasks to Address

In a grant-free multiple access situation, if a user has data to send, the data and the pilot can be transmitted from the resource, in which several users are competing, without reservation and grant for the resource. At this time, it is assumed that the data and the pilot are being overlapped in a non-orthogonal manner with other data and pilots.

The technical tasks to be solved by this invention are to provide: a deep learning-based AUD method using both the data and the pilot when a user sends pilot and data together at once in the non-orthogonal grant-free multi-access situation and a transmission/reception structure enabling the data detection for multiple active users by utilizing the method.

The technical tasks of this invention are not limited to the above-mentioned technical tasks, and other technical tasks not mentioned will be clearly understood by ordinary skilled technicians in the field from the descriptions below.

Means to Address the Tasks

The method performed by a base station in a wireless communication system according to an embodiment of this invention for achieving the above-mentioned technical tasks includes the following steps: a step to transmit a codebook allocated for data transmission to each of multiple user terminals; a step to receive the pilot and the data from one or more user terminals among above-mentioned multiple terminals; a step to generate active user information based on the above-mentioned data; a step to detect an active user terminal among above-mentioned multiple terminals based on the pilot and the active user information; a step to generate the channel estimation information related to the active user terminal; a step to detect the data of the active user terminal based on the above-mentioned channel estimation information.

According to an embodiment, the data is received through a codeword transmitted based on the codebook allocated to each of the above-mentioned one or more user terminals, and the pilot received from the above-mentioned one or more user terminals can be the one that the user terminal randomly selects among the multiple pilots which the above-mentioned base station has generated in advance to transmit and allocate to the multiple user terminals in relation to the code book, or the one that is generated in real time to be related to the code book allocated to one or more user terminals through the pilot generation unit of the user terminals.

According to an embodiment, the method can further include a step where a signal to update the above-mentioned pilot generator is transmitted to the one or more user terminals and, once the signal for updating the pilot generator is transmitted, the above-mentioned pilot may be the one generated in real time to be associated with a codebook allocated to the one or more user terminals through the updated pilot generator.

According to an embodiment, the steps to generate the active user information and to detect the active user terminal are performed based on a learned neural network; the above-mentioned neural network is learned based on step 1 learning and the step 2 learning; the step 1 learning is performed using the first loss function defined based on the information indicating activation states of above-mentioned multiple user terminals and the above-mentioned active user information; the above-mentioned step 2 learning can be performed using the second loss function defined based on information indicating activation states of above-mentioned multiple user terminals and information indicating estimated activation states for the multiple user terminals.

According to an embodiment, the method can further include a step to transmit the information indicating the length of the data to the one or more user terminals; the step to transmit the information indicating the length of the data can include either a step to transmit the information indicating the length of the data to the one or more user terminals based on the data length change request received from the above-mentioned one or more user terminals, or a step to transmit the information indicating the length of the data to the above-mentioned one or more user terminals when the pre-set condition is satisfied.

According to an embodiment of this invention, the method performed by a user terminal in a wireless communication system can include a step to receive an allocated codebook for data transmission of the above-mentioned user terminal, a step to generate the data based on the above-mentioned codebook, a step to select or generate a pilot, and a step to transmit the above-mentioned pilot and data to the above-mentioned base station, wherein the above-mentioned user terminal can be detected as the active user terminal among the multiple user terminals based on the active user information generated based on the above-mentioned data and pilot.

According to an embodiment, the above-mentioned data is transmitted with a codeword sent based on a codebook allocated to the above-mentioned user terminal, wherein the above-mentioned pilot may be the one that is randomly chosen among the multiple pilots generated in advance by the base station and allocated to the above-mentioned user terminal for their transmission associated with the codebook, or the one that is generated in real time through the pilot generation unit of the user terminal to be associated with the above-mentioned codebook allocated to the user terminal.

According to an embodiment, the method can further include a step to receive a signal for updating the above-mentioned pilot generation unit from the above-mentioned base station; when the signal for updating the pilot generation unit is received, the above-mentioned pilot can be generated in real time to be associated with the codebook assigned to the above-mentioned user terminal through the updated pilot generation unit.

According to an embodiment, the above-mentioned user terminal is detected as an active user terminal among the multiple user terminals based on the learned neural network; the above-mentioned neural network is learned based on above-mentioned step 1 learning and step 2 learning; the above-mentioned step 1 learning is performed using the first loss function defined based on the information representing the activation states of the above-mentioned multiple user terminals and the active user information; the above-mentioned step 2 learning is performed using the second loss function defined based on the information representing the activation state of the above-mentioned multiple user terminals and the information representing the estimated activation state of the multiple user terminals.

According to an embodiment, the method can further include a step to receive the information indicating the length of the data from the above-mentioned base station; the above-mentioned step to receive the information indicating the data length can include a step to receive the information indicating the length of the data from the base station based on a data length change request sent from the user terminal, or a step to receive the above-mentioned information indicating the length of the data when a pre-set condition is satisfied.

According to an embodiment of this invention, the base station of a wireless communication system can include a transceiver transmitting and receiving signals to and from a user terminal and one or more processors connected to the above-mentioned transceiver; wherein the above-mentioned one or more processors can control the base station to transmit a codebook allocated for data transmission to each of the multiple user terminals; to receive the pilot and data from the one or more user terminals among the multiple user terminals; to generate the active user information based on the above-mentioned data; to detect an active user terminal among the above-mentioned multiple user terminals based on the above-mentioned pilot and active user information; to generate the channel estimation information related to the above-mentioned active user terminal; and to detect the data from the active user terminal based on the above-mentioned channel estimation information.

According to an embodiment, the above-mentioned data can be either a pilot randomly selected by the above-mentioned user terminal among the pilots that the above-mentioned base station has generated in advance to allocate to multiple user terminals by for the transmission in relation to the code book after receiving them through the codeword transmitted based on a codebook assigned to each of above-mentioned one or more user terminals; or a pilot that is generated in real time to be associated with a codebook allocated to each of above-mentioned one or more user terminals through a pilot generation unit of the above-mentioned user terminals.

According to an embodiment, the one or more processors mentioned above can control the above-mentioned base station to transmit a signal for updating the above-mentioned pilot generation unit to above-mentioned one or more user terminals; once the signal for updating the above-mentioned pilot generation unit is transmitted, the above-mentioned pilot may be the pilot generated in real time to be associated with the codebook allocated to the above-mentioned one or more user terminals through the updated pilot generation unit.

According to an embodiment, the one or more processors mentioned above can control it to generate the above-mentioned active user information based on a learned neural network and to detect the above-mentioned active user terminal; the above-mentioned neural network learns based on the step 1 learning and second-step learning; the above-mentioned step 1 learning is performed using a first loss function defined with the information indicating the activation state of the above-mentioned multiple user terminals and the above-mentioned active user information; the above-mentioned step 2 learning can be performed using a second loss function defined with the information indicating the activation state of the above-mentioned multiple user terminals and the information representing the estimated activation states of the above-mentioned multiple user terminals.

According to an embodiment, the one or more processors mentioned above control the above-mentioned base station to transmit the information indicating the length of the above-mentioned data to the one or more user terminals mentioned above; the one or more processors mentioned above can control the above-mentioned base station to transmit the information indicating the length of the data to the one or more user terminals based on the data length change request received from the above-mentioned one or more user terminals, or to transmit the information indicating the length of the above-mentioned data to the one or more user terminals mentioned above when a pre-set condition is satisfied.

According to an embodiment of this invention, the user terminal of a wireless communication system can include a transceiver for transmitting and receiving signals to and from the base station and one or more processors connected to the above-mentioned transceiver, wherein the one or more processors control the user terminal to receive a codebook allocated for data transmission, to generate the data based on the above-mentioned codebook, to select or generate a pilot, and to transmit the above-mentioned pilot and data to the above-mentioned base station; the above-mentioned user terminal may be detected as an active user terminal among multiple user terminals based on active user information generated with the above-mentioned data and the above-mentioned pilot.

According to an embodiment, the above-mentioned data can be either a pilot randomly selected by the above-mentioned user terminal among the pilots that the above-mentioned base station has generated in advance to allocate to multiple user terminals by for the transmission in relation to the code book after receiving them through the codeword transmitted based on a codebook assigned to each of above-mentioned one or more user terminals; or a pilot that is generated in real time to be associated with a codebook allocated to each of above-mentioned one or more user terminals through a pilot generation unit of the above-mentioned user terminals.

According to an embodiment, the one or more processors mentioned above can control the user terminal to receive a signal for updating the above-mentioned pilot generation unit from the base station; when the signal for updating the pilot generation unit is received, the above-mentioned pilot can be generated in real time to be associated with the codebook assigned to the above-mentioned user terminal through the updated pilot generation unit.

According to an embodiment, the above-mentioned user terminal can be detected as an active user terminal among the above-mentioned multiple user terminals based on the learned neural network; the above-mentioned neural network is learned based on above-mentioned step 1 learning and step 2 learning; the above-mentioned step 1 learning can be performed using the first loss function defined based on the information representing the activation states of the above-mentioned multiple user terminals and the active user information; the above-mentioned step 2 learning can be performed using the second loss function defined based on the information representing the activation state of the above-mentioned multiple user terminals and the information representing the estimated activation state of the multiple user terminals According to an embodiment, the one or more processors can control the user terminal to receive the information indicating the length of the data from the above-mentioned base station; the above-mentioned one or more processors can control the user terminal to receive the information indicating the length of above-mentioned data from the base station based on a data-length change request transmitted from the above-mentioned user terminal, or to receive the information indicating the length of data when a pre-set condition is satisfied.

Effects of the Invention

According to this invention as described above, when a user data symbol and a pilot symbol are transmitted at once in an uplink grant-free multiple access situation through non-orthogonal multiple access, it can use both the pilot and the data for detection of the active user so as to be more effective in raising the activity error rate (AER) performance and thereby the data detection performance than the existing technology that uses only the pilot for it.

The effects of this invention are not limited to the effects mentioned above, and the other unmentioned effects will be clearly understood by the skilled technicians in the field from the descriptions below.

BRIEF DESCRIPTION OF THE FIGURES

FIG. 1 is a diagram showing an example of a grant-free communication system according to an embodiment of this invention.

FIG. 2 is a diagram showing an example of a conventional method for detecting an active user in a grant-free communication system.

FIG. 3 is a diagram showing an example of an active user detection method using the user activity extraction (UAE) in a grant-free communication system according to an embodiment of this invention.

FIG. 4 is a diagram illustrating an active user detection method using the UAE implemented based on a neural network according to an embodiment of this invention.

FIG. 5 is a diagram illustrating a neural network learning method for implementing an active user detection method using UAE according to an embodiment of this invention.

FIG. 6 is a diagram showing an example of a grant-free multiple access system based on non-orthogonal multiple access in the code domain according to an embodiment of this invention.

FIG. 7 is a diagram illustrating a conventional method of detecting an active user in a CD-NOMA based grant-free communication system.

FIG. 8 is a diagram illustrating a network for detecting an active user using the data according to an embodiment of this invention.

FIG. 9 is a diagram showing an example of an AUD network structure according to an embodiment of this invention.

FIG. 10 is a diagram showing an example of a UAE network structure according to an embodiment of this invention.

FIG. 11a is a diagram illustrating a method for indicating a data length change according to an embodiment of this invention.

FIG. 11b is a diagram showing another example of a method for indicating a data length change according to an embodiment of this invention.

FIG. 12 is a diagram showing an example of activity error rate (AER) performance according to the data length L.

FIG. 13 is a diagram showing another example of activity error rate (AER) performance according to the data length L.

FIG. 14 is a diagram illustrating an activity error rate (AER) performance according to the network learning method.

FIG. 15 is a diagram showing the structure of a user terminal according to an embodiment of this invention.

FIG. 16 is a diagram showing the structure of a base station according to an embodiment of this invention.

SPECIFIC CONTENTS FOR IMPLEMENTING THE INVENTION

Hereinafter, the embodiments of this invention are described in detail with reference to the accompanying drawings.

In describing the embodiments, descriptions of technical contents that are well known in the technical field to which this invention belongs and are not directly related to this invention will be omitted. This is to more clearly convey the gist of this invention without obscuring it by omitting unnecessary descriptions.

For the same reason, some components in the accompanying drawings are exaggerated, omitted, or schematically illustrated. Furthermore, the size of each component does not entirely reflect the actual size. In each figure, the same reference number is given to the same or corresponding component.

Advantages and features of this invention and methods of achieving them will become clearer if you refer to the following detailed description of the embodiments along with the accompanying drawings. However, this invention is not limited to the embodiments disclosed below, but may be implemented in various different forms; the embodiments in here are just intended to completely disclose this invention and its scope to the people of common knowledge in the field to which this invention belongs. This invention is only defined by the scope of the claims. Throughout the specification, the same reference numerals designate the same elements. And, in describing this invention, if a detailed description on the related function or configuration is considered to make the key concepts of this invention unnecessarily obscure, the description will be omitted. In addition, the terms described later have been defined in consideration of functions in this invention, which may vary according to the intention or custom of users or operators. Therefore, the definition should be made based on the contents throughout this specification.

Hereinafter, the base station is a subject that performs the resource allocation for the terminals, and may be one or more of followings: gNode B (gNB), eNode B (eNB), Node B, base station (BS), radio access unit, base station controller, and node on a network. The terminal may be any of user equipment (UE), mobile station (MS), cellular phone, smart phone, computer, or multimedia system capable of performing the communication functions.

In this invention, the downlink (DL) is the wireless path of a signal transmitted from a base station to a terminal, and the uplink (UL) refers to the path of a signal transmitted from a terminal to a base station.

Although a long-term evolution (LTE) or LTE-advanced (LTE-A) system may be described below as an example, the embodiments of this invention may be applied to other communication systems having a similar technical background or channel type. For example, the 5G mobile communication or new radio (NR) developed after LTE-A may be included in this. Hereinafter, the 5G may be a concept including existing LTE, LTE-A and other similar services. In addition, this invention can be applied to other communication systems through some modifications within a range that does not significantly deviate from the scope of this invention as determined by the persons with skillful technical knowledge.

At this time, they can surely understand that each block in the process flow chart diagrams and combinations of the diagrams can be performed by the computer program instructions. As these computer program instructions may be embodied in the processors of the general purpose computer, special purpose computer, or other programmable data processing equipment, the instructions executed by the processors of the computer or other programmable data processing equipment will create the means to perform the functions described in the flowchart block(s). These computer program instructions may also be stored in a computer usable or computer readable memory that can be directed to a computer or other programmable data processing equipment to implement the functions in a particular way. Therefore, the instructions stored in such computer usable or computer readable memory can also produce the production articles containing the instruction means that perform the functions described in the flowchart block(s). The computer program instructions can also be loaded on a computer or other programmable data processing equipment. Therefore, a series of operational steps can be performed on the computer or other programmable data processing equipment to create the computer-executed processes. Thus, the instructions for executing a computer or other programmable data processing equipment may also provide the steps for carrying out the functions described in the flowchart block(s).

In addition, each block may represent a part of the module, segment or code that includes one or more executable instructions for executing the specified logical function(s). It should also be noted that in some alternative implementation embodiments the functions mentioned in the blocks may occur out of order. For example, two adjacent blocks shown in the diagram may in fact be performed simultaneously, or the blocks may sometimes be performed in reverse order depending on their functions.

At this time, the term '~unit' used in this embodiment means a software or a hardware component such as field programmable gate array (FPGA) or application specific integrated circuit (ASIC). The '~unit' can perform certain roles. However, '~part' is not limited to software or hardware. This may be configured to reside in an addressable storage medium or to reproduce one or more processors. Therefore, as an example, '~unit' can include components such as software components, object-oriented software components, class components, and task components; processes; functions, properties; procedures; subroutines; segments of program code; drivers; firmwares; microcodes; circuits; data; databases; data structures; tables; arrays; and variables. Functions provided within the components and the '~units' may be combined into smaller numbers of components and '~units' or further separated into more components and '~units'. In addition, the components and the '~units' may be implemented to reproduce one or more central processing units (CPUs) in the device or the security multimedia card. Furthermore, in an embodiment, '~unit' may include one or more processors.

The wireless communication system has moved away from providing the voice-oriented services in early days and now is developing to a broadband wireless network that provides high-speed, high-quality packet data services such as HSPA (High Speed Packet Access) of 3GPP, LTE (Long Term Evolution or E-UTRA (Evolved Universal Terrestrial Radio Access)), LTE-Advanced (LTE-A), LTE-Pro, 3GPP2's High Rate Packet Data (HRPD), UMB (Ultra Mobile Broadband), and IEEE's 802.16e.

As a representative example of the broadband wireless communication system, in the LTE system, the Orthogonal Frequency Division Multiplexing (OFDM) method is employed for downlink (DL), and the SC-FDMA (Single Carrier Frequency Division Multiplexing Access) method is used for uplink (UL). The uplink refers to a radio link in which a terminal (UE: User Equipment) or MS (Mobile Station)) transmits the data or the control signals to a base station (eNode B or base station (BS)); and the downlink refers to a radio link in which a base station transmits the data or the control signals to a terminal. The multiple access scheme as described above can distinguish the data or the control information of each user by allocating and operating the time-frequency resources to carry the data or the control information for each user so that they do not overlap each other, that is, so that orthogonality is established.

As a future communication system after LTE, the 5G communication system should be able to freely reflect various requirements from users and service providers, providing the service that satisfies various requirements at the same time. The services expected for the 5G communication system include the enhanced mobile broadband (eMBB), the massive machine type communication (mMTC), the ultra reliability low latency communication (URLLC), etc.

The eMBB aims to provide a data transmission rate that is more improved than that supported by existing LTE, LTE-A or LTE-Pro. For example, in a 5G communication system, the eMBB should be able to provide the peak data rate of 20 Gbps in the downlink and of 10 Gbps in the uplink from the perspective of one base station. In addition, the 5G communication system should provide not only the maximum transmission rate but also the enhanced user perceived data rate of the terminal. In order to satisfy these requirements, various improved transmission/reception technologies including the more advanced multi-input multi-output (MIMO) transmission technology are required. While LTE transmits the signals using the maximum 20 MHz bandwidth in the 2 GHz band used by it, the 5G communication system uses a frequency bandwidth wider than 20 MHz in a frequency band of 3-6 GHz or higher than 6 GHz, thereby satisfying the data transmission speed required by the 5G communication system.

At the same time, the mMTC is being considered in the 5G communication systems to support application services such as Internet of Things (IoT). In order to efficiently provide the IoT, the mMTC requires the access support for large-scale terminals within the cell, the improved coverage of terminals, the improved battery time, and the reduced terminal cost. Since the IoT is attached to various sensors and devices to provide the communication functions, it should be able to support a large number of terminals (eg, 1,000,000 terminals/km²) in the cell. In addition, since the terminal supporting the mMTC is likely to be located in a shadow area that is not covered by the cell, e.g. the basement of a building, due to the nature of the service, it may require a wider coverage than other services provided by the 5G communication system. The terminal supporting the mMTC should be composed of low-cost units and, since its battery is hard to frequently replace, a very long battery life time such as 10 to 15 years may be required.

Finally, the URLLC is a mission-critical cellular-based wireless communication service. For example, this service can be used for the remote control of robots or machinery, the industrial automation, the unmanned aerial vehicles, the remote health care and the emergency situations. A service used for emergency alert or the like may be considered. Therefore, the communication provided by the URLLC should provide very low latency and very high reliability. For example, the service supporting the URLLC should satisfy the air interface latency of less than 0.5 milliseconds as well as the packet error rate of $10^{-5}$ or less. Therefore, for the service that supports URLLC, the 5G system should provide a smaller transmit time interval (TTI) than other services. And, at the same time, a design that allocates wide resources in the frequency band to secure the reliability of the communication link. may be requested for it.

The three 5G services (eMBB, URLLC, and mMTC) can be multiplexed and transmitted in one system. At this time, in order to satisfy the different requirements of each service, different transmission/reception techniques and parameters may be used among the services. Of course, 5G is not limited to the three services mentioned above.

This invention considers a communication system (e.g., a massive IoT system) in which many users simultaneously transmit uplinks through multiple accesses. In the following descriptions, the 'user' constituting the communication system may be understood as a terminal, a user terminal, an IoT sensor, or an IoT device.

In the existing 4G mobile communication standards, in order for multiple IoT devices to simultaneously transmit data through uplink, each user should be granted the uplink resources for the data transmission through reservation. However, since these IoT devices have a relatively small amount of transmission data, it is very inefficient to reserve and allocate the resources individually to a large number of IoT users because the signal load for the reservation and resource allocation is so large compared to the amount of transmitted data. Therefore, the grant-free multiple access in which the data and the pilot are transmitted together without a separate reservation can be considered in a system in which multiple devices make an access together.

In the following descriptions, the pilot may be understood to refer to terms such as the pilot symbol, the pilot sequence, or the pilot signal.

In addition, in the following descriptions, the data may be understood as referring to terms such as the data symbol, the bit sequence, the codeword, or the codeword data.

FIG. 1 is a diagram showing an example of a grant-free communication system according to an embodiment of this invention.

One of the differences between the grant-free communication system in FIG. 1 and the existing reservation-based communication system is that the procedure for resource reservation and allocation between the base station and the user is not performed in advance, so the base station cannot know which user will transmit the data.

In other words, while the base station can know in advance which user will transmit data, that is, which user is active, in the existing reservation-type communication system, whereas the base station cannot know in advance which one out of numerous users will send the data in the grant-free communication system. Therefore, in the grant-free system, the base station needs to detect the active user who has transmitted the corresponding data symbol before detecting the data symbol.

The method of detecting the data symbol in a situation where the active user is not known in advance is called the blind detection method, and the procedure for identifying the active user prior to the blind detection is called the active user detection (AUD).

If the base station successfully performs the AUD procedure in a grant-free multiple access system, the base station comes to know which user is activated. Therefore, it can perform the subsequent channel estimation and data reception procedures based on this. That is, the performance of the AUD procedure affects the channel estimation performance for active users, and this channel estimation performance has in turn a significant effect on the data detection performance for active users. Thus, this invention proposes a method and an apparatus for it to improve the AUD performance for increasing the data detection performance in a grant-free transmission situation of numerous IoT devices.

Figure 2:
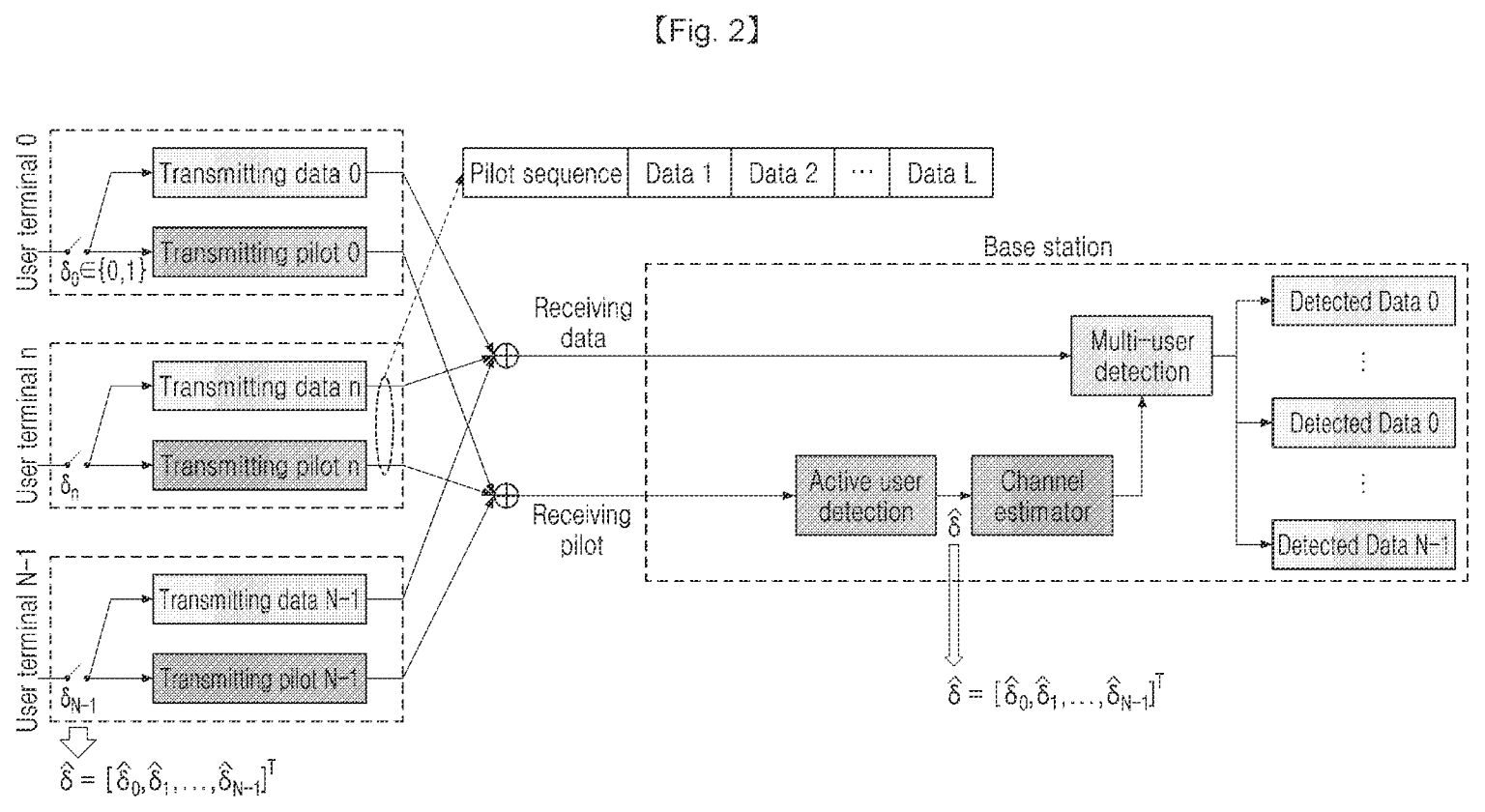

FIG. 2 is a diagram showing an example of a conventional method for detecting an active user in a grant-free communication system.

Referring to FIG. 2, each user transmits the data and the pilot from the transmitter, and the base station can receive the data and pilot transmitted by each user. At this time, all kinds of user's data and pilots may be overlapped in resources.

In the grant-free communication system, the base station cannot know which user has transmitted the data. So, it first performs the AUD procedure using the pilots from each user to detect the active user, and then it can perform the channel estimation for the detected active user.

Then, the base station can detect the data of each user through multi-user detection based on the channel estimation information of each user. As shown in FIG. 2, according to the method of detecting an active user in the existing grant-free communication system, the base station performs the AUD using only the pilot.

FIG. 3 is a diagram showing an example of the active user detection method using User Activity Extraction (UAE) in a grant-free communication system according to an embodiment of this invention.

Referring to FIG. 3, the base station of this invention may generate the active user information $\alpha$ using the data received from each user through the active user information extractor. The active user information $\alpha$ generated by the active user information extractor of the base station can be used as an input value for AUD, and the base station can detect the active users by utilizing both the pilot received from each user and the active user information $\alpha$.

Then, the base station performs the channel estimation for the detected active user, and can detect the data of each user through multi-user detection based on the channel estimation information of each user. As shown in FIG. 3, the active user detection method using the UAE according to an embodiment of this invention, unlike the existing method of FIG. 2, can use the active user information $\alpha$ extracted based on the received data as well as the received pilots.

Figure 4:
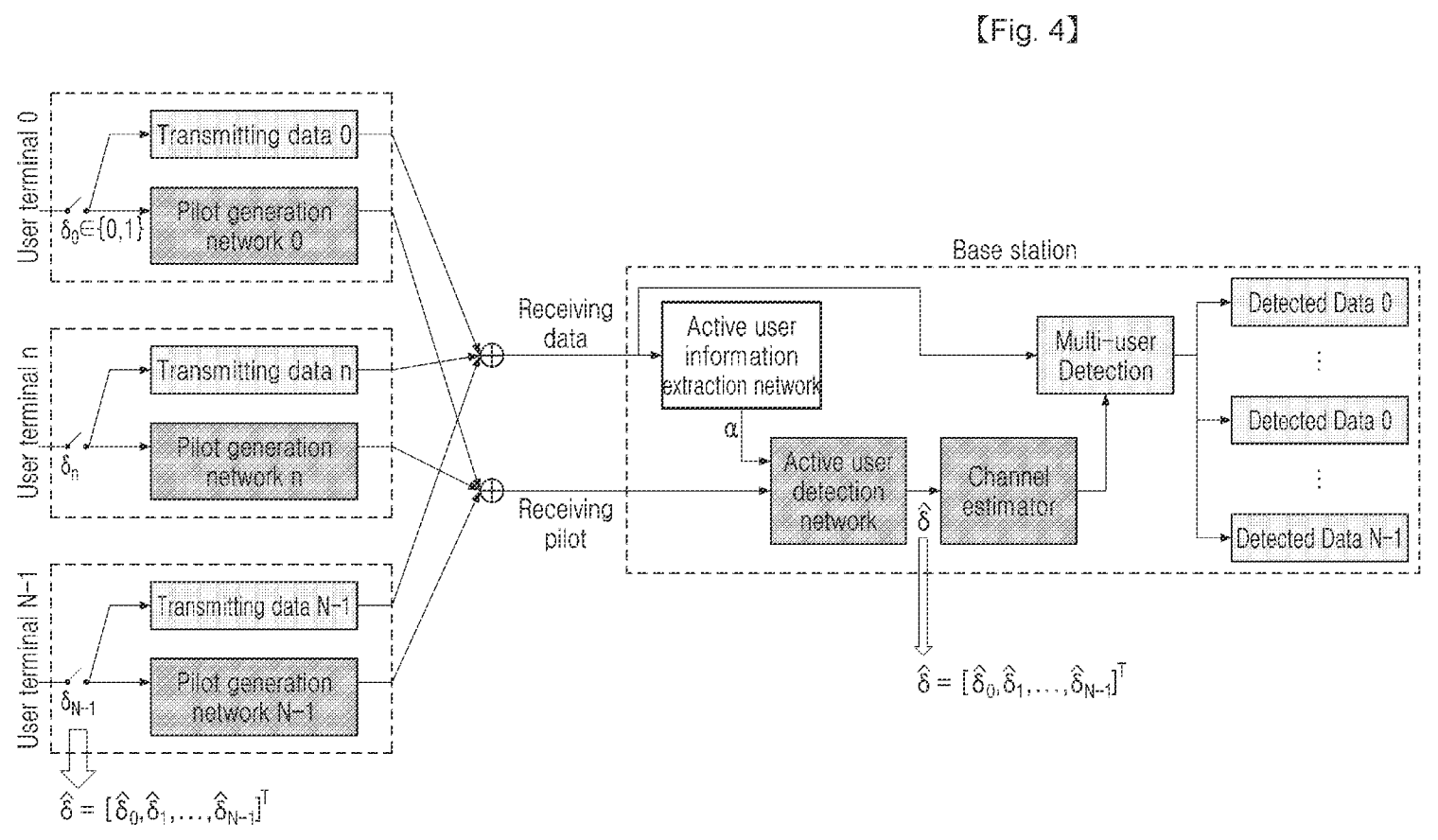

FIG. 4 is a diagram illustrating an active user detection method using the UAE implemented based on the neural network according to an embodiment of this invention.

In an embodiment of this invention, the user activity extraction (UAE) and the active user detection (AUD) of a base station receiver may be configured as a neural network (NN) for learning. Furthermore, the pilot generation of the user transmitter may also be configured as a neural network for learning.

In the following descriptions, the UAE and the AUD of the receiver and the PG of the transmitter composed of neural networks may be called the UAE network, the AUD network, and the PG network, respectively. The structure of the neural network for implementing the UAE network, the AUD network, and the PG network is not limited to the specific implementations, and may be implemented through any methods such as the fully connected layer, the convolutional layer, the drop-out layer, and the residual layer.

FIG. 5 is a diagram illustrating an example of a neural network learning method to implement the AUD method using UAE according to an embodiment of this invention.

Referring to FIG. 5, learnings of the UAE network, the AUD network, and the PG network may be implemented through 2-step learning using autoencoding as an example.

In the step 1, learning on the UAE network can be performed through the autoencoding that minimizes the loss function composed of activity vector $\delta$ and active user information $\alpha$ shown in FIG. 4. Here, the activity vector $\delta=[\delta_0, \delta_1, \ldots, \delta_{N-1}]^T$ consists of the activity indicators $\delta_0$, $\delta_1, \ldots, \delta_{N-1}$ for each user, and the activity indicators $\delta\_n$ is a parameter defined to have the value of 1 if user n is sending the data (i.e. user n is an active user) and the value of 0 if user n is not sending data (i.e. user n is an inactive user).

In the step 2, learning of the end-to-end network including the PG network, AUD network and UAE network through the autoencoding that minimizes the loss function consisting of the activity vector $\delta$ in FIG. 4 and the activity vector $\hat{\delta}$ estimated by the AUD network can be performed. Among estimated activity vectors $\hat{\delta}=[\hat{\delta}_0, \hat{\delta}_1, \ldots, \hat{\delta}_{N-1}]^T$ that are estimated through the AUD network, $\hat{\delta}_n$ has the value of 1 if the user n is estimated as an active user as a result of the estimation, or the value of 0 when the user n is estimated to be an inactive user as a result of estimation.

According to this invention, more effective learning can be performed through the 2-step learning in FIG. 5 when compared to the end-to-end learning composed of just $\delta$ and $\hat{\delta}$. The specific examples of loss functions for performing the autoencoding in the step 1 and 2 will be described below.

As a specific example to which the various embodiments of this invention described above are applied, below is assumed an uplink grant-free multiple access situation based on CD-NOMA (code-domain non-orthogonal multiple access) in which the users activated in a contention window composed of the same time-frequency resources are transmitting a contention transmission unit (CTU) composed of pilot and codeword data.

FIG. 6 is a diagram showing an example of a grant-free multiple access system based on CD-NOMA according to an embodiment of this invention.

Referring to FIG. 6, all the users in the communication system of this invention do not transmit the data through the non-orthogonal multiple access, but only the active users among them transmit the CTU, and the other non-active users may not. Since the CD-NOMA-based grant-free transmission is assumed, each user can transmit the data using a CD-NOMA technology such as SCMA (sparse code multiple access) or PDMA (pattern division multiple access).

In other words, when transmitting the data, each user selects and transmits the codewords as many as L from a codebook composed of the codewords as many as M in order to transmit M-ary symbols representing the $\log_2 M$ bits, and together with data composed of L codewords. Along with this data consisting of L codewords, the user may transmit the pilot or preamble for CE (channel estimation) and AUD (active user detection) through the CTU. In the example of FIG. 6, each active user can use the codebooks as many as J ($\tilde{c}=\{\mathcal{C}_0, \mathcal{C}_1, \ldots, \mathcal{C}_{J-1}\}$) in the mother codebook set to perform the codebook-based uplink grant-free multiple access.

Figure 7:
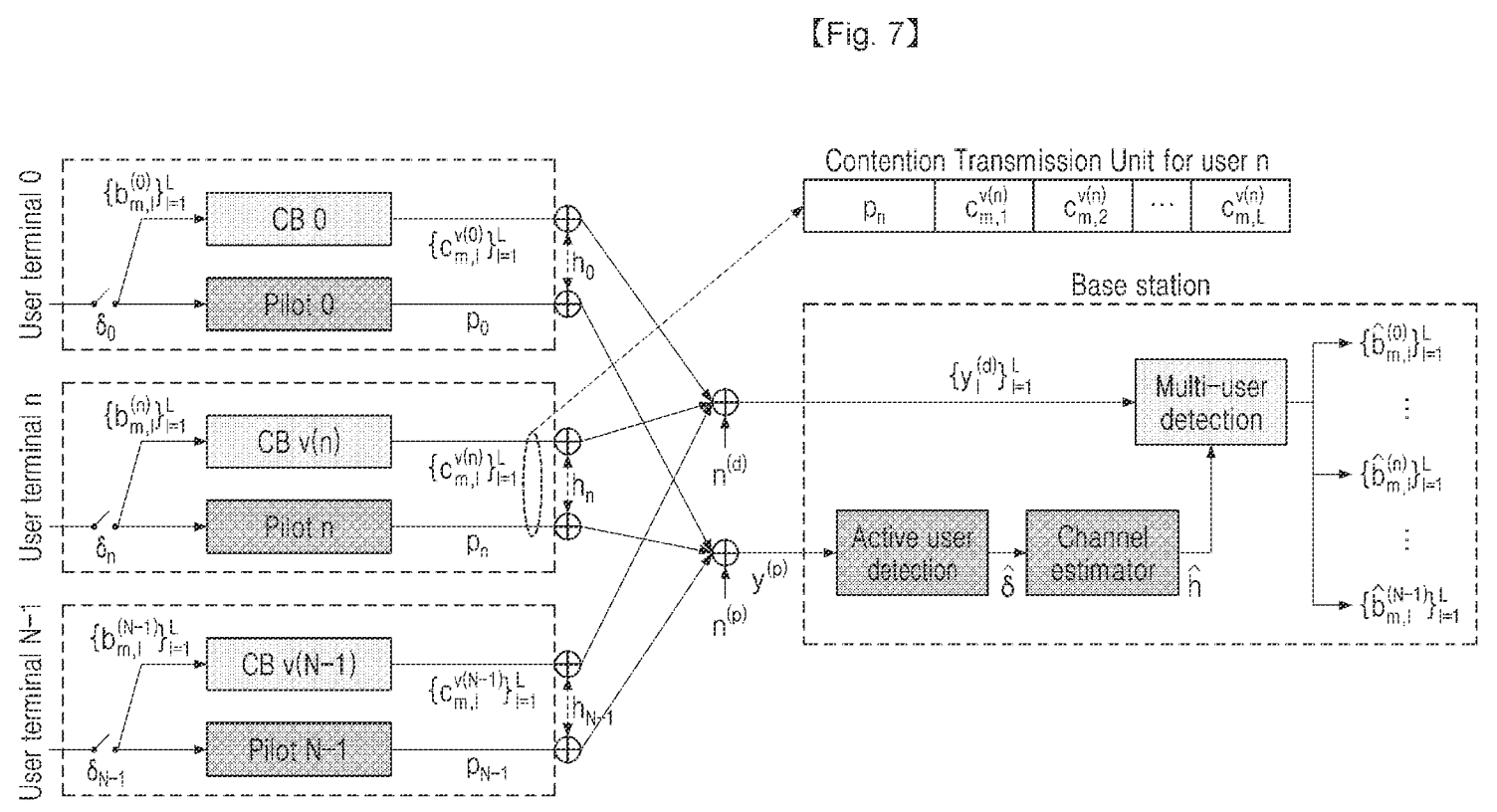

FIG. 7 is a diagram illustrating a conventional method of detecting an active user in a CD-NOMA based grant-free communication system.

Referring to FIG. 7, all or some of the N users with the index $n \in \{0, 1, \ldots, N-1\}$ can perform the codebook-based uplink grant-free multiple access using the different codebooks as many as J ($\bar{c} = \{\mathcal{C}_0, \mathcal{C}_1, \ldots, \mathcal{C}_{J-1}\}$) in the mother codebook set Let's assume a situation in which only N a users out of all N users are activated and transmit the pilot and the data in one transmission unit, and the other users are deactivated without transmitting the pilot and the data. User$_n$ has an activity probability $p_n$ that determines an activation state for transmitting its own data and an activity indicator $\delta_n \sim \text{Bern}(p_n)$ following the Bernoulli distribution. If the active indicator $\delta_n$ is 1, Users is likely to transmit the data; if $\delta_n$ is 0, User$_n$ is not likely to transmit the data. The activity indicators constitute the activity vector $\delta = [\delta_0, \delta_1, \ldots, \delta_{N-1}]^T$, and the average of the activity probabilities for all N users constituting the system can be expressed as $$\bar{p} = \sum_{n=0}^{N-1} p_n.$$

To perform the grant-free multiple access, an activated user can transmit the pilot sequence and his/her own data at the same time. At this time, the user performs the data transmission through the codewords transmitted based on the codebook. Therefore, the user can select one codebook among J M-ary codebooks belonging to $\bar{c}$ for transmitting the data. In order to transmit the M-ary data, the user selects and transmits one of the M codewords of the codebook allocated to the user. At this time, the codebook index assigned to the n-th user may be determined in a round-robin form, such as $v(n) = \text{mod}(n, J)$. That is, in order to transmit the bit sequence of $$b_m^{(n)} \in \mathbb{B}^{\log_2 M},$$

the user can transmit the m-th codeword $$c_m^{v(n)} \in \mathbb{C}^{K^{(d)}}$$

indicating $$b_m^{(n)}$$

in the M-ary codebook of index $v(n)$ allocated to the user. Therefore, when the user transmits L codewords, the data is transmitted using $L \cdot \log_2 M$ bit.

In IoT systems, it is assumed in general that $N \gg J$, that is, the number of users is much greater than the number of codebooks. Therefore, when a codebook is allotted to each user in the aforementioned round-robin form, the same codebook can be reused by multiple users. At this time, even if two different active users use the same codebook, they can be distinguished in the data reception process if the users pass through the sufficiently different channels. Thus, the activity error rate (AER) and the channel estimation performance according to the pilot transmission for accurate active user and channel estimation have a decisive effect on the final data reception performance of the grant-free multiple access.

Meanwhile, if two users select the same pilot to make both the codebook and the pilot overlapped, users cannot be distinguished. If the total number of pilots is N, the maximum number of users that can access simultaneously becomes N. Assuming the codebook allocation based on the round-robin form, each of J codebooks may be combined with as many as [N/J] or [N/J]−1 pilots. At this time, each user may randomly select and transmit any of the J codebooks allotted to the user as well as one of [N/J] or [N/J]−1 pilots coupled to it. As J codebooks and [N/J] or [N/J]−1 pilots coupled thereto are allocated in this way, it can be seen that there are N unique CTUs. The CTU becomes a basic unit for signal transmission in the codebook-based uplink contention-based access. In addition to the round-robin method, N codebooks can also be allocated to users through the random method or the quasi-random method. In this case, if $N \gg J$ is assumed, each of J codebooks can be associated with multiple pilots, and the user can randomly select and transmit any of the multiple pilots associated with the codebook data. Thus, this invention can operate without being limited to a specific codebook allocation scheme.

As shown in FIG. 6, the transmitter of the nth user may transmit the pilot $p_n \in \mathbb{C}^{K_p}$ along with L codeword vector sequences of $K_{(d)}$ dimensions through the CTU. In this case, the pilot and the data sent to the CTU of nth user may overlap non-orthogonally within a contention region for them. At this time, each pilot is overlapped in the $K^{(p)}$ resources, and the l-th codeword is overlapped in the $K^{(d)} \cdot l$ th (from $K^{(d)} \cdot (l-1)+1$) resource. Therefore, as shown in FIG. 6, the number of resources for pilot is $K^{(p)}$ and that for data is $L \cdot K^{(d)}$. When a transmitter transmits a CTU according to the activity, it is assumed that the pilot and the data in the CTU will overlap in a contention area, and the CTU will be transmitted within a coherence time and suffer a flat fading. Therefore, the pilot and the data of n-th user will have the same fading channel coefficient $h_n$, and the channels of all users will construct a vector channel of $h = [h_0, h_1, \ldots, h_{N-1}]^T$. At this time, if any overlapped pilot and codeword pass through the flat fading channel, the pilot reception signal $y^{(p)}$ and the data reception signal $$y_1^{(d)}$$

overlapped with the 1-th codeword can be expressed as [Equation 1] and [Equation 2] below:

$$y^{(p)} = \sum_{n=0}^{N-1} \delta_n h_n p_n + n^{(p)} \qquad [\text{Eq. 1}]$$

$$y_l^{(d)} = \sum_{n=0}^{N-1} \delta_n h_n c_{m,l}^{v(n)} + n_l^{(d)} \qquad [\text{Eq. 2}]$$

Thus, through the CTU of each user, the base station receiver obtains the overlapping pilot $y^{(p)}$ of $K^{(p)}$ dimensions and L overlapping codewords $$\{y_l^{(d)}\}_{l=1}^{L}$$

of $K^{(d)}$ dimensions. At this time, since the base station cannot know which user has transmitted each of the overlapped signals, it performs the AUD through the pilot $y^{(p)}$ of the CTU to detect the estimated activity vector $\hat{\delta}=[\hat{\delta}_0,$ $\hat{\delta}_1, \ldots, \hat{\delta}_{N-1}]^T$. After then, the base station estimates $\hat{h}=[\hat{h}_0,$ $\hat{h}_1, \ldots, \hat{h}_{N-1}]^T$ through the channel estimation, with which the multi-user detection (MUD) is performed for the overlapping data signal $$\{y_1^{(d)}\}_{l=1}^L,$$

to estimate the transmission data of all users $$\{\{b_{m,l}^{(n)}\}_{l=1}^L\}_{n=0}^{N-1}.$$

In the above description with reference to FIG. 7, the CTU from the user is composed of L codewords for transmitting the pilot and the data, and the base station receiver receives both the pilot and the data through the CTU. Despite it, in the conventional method, the base station just uses the pilot of the CTU to detect the active user and to estimate the channel. However, since the CTU also includes the information on the codebook data used by each user along with the pilot, AUD performance can be improved if the CTU is used for detecting the active user of the ADU. And such improvement in AUD performance may lead to the improvement in channel estimation and the data detection performance. Therefore, this invention proposes a method of detecting the active user by utilizing the data together in a CD-NOMA based grant-free communication system.

FIG. 8 is a diagram illustrating a network for detecting the active user using the data according to an embodiment of this invention.

Referring to FIG. 8, the network for detecting the active user using the data according to an embodiment of this invention can consist of a pilot generation (PG) network $$\{f(\cdot)\}_{n=0}^{N-1}$$

for the user's transmitter, an active user detection (AUD) network g(•) and an user activity extraction (UAE) network h(•) for the base station receiver.

According to an embodiment, a channel autoencoder can be configured with a PG network of the user transmitter and an AUD network of the base station receiver, with which the end-to-end learning is performed to design the PG network and the AUD network having good characteristics for a learning channel.

The PG network has one $2 \cdot K^{(p)}$ dense network to generate the complex pilot with the length of $K^{(p)}$. After then, it can be normalized to $\|p_n\|_2=1$. The PG network allocated to $User_n$ may have the characteristics related to the data transmitted by the relevant user.

For example, if the data is transmitted using one of J codebooks composed of M-ary codewords, the pilot generated in real time in the PG network is associated with the codebook selected by the user for the data transmission. In case that the total number of codebooks is J and the number of pilots is N, the pilots are divided into J pilot groups for each codebook. At this time, the user can transmit data using a codebook selected for the data transmission as well as one of the pilots associated with the selected codebook as the pilot. Therefore, the PG network of the user terminal can learn to generate in real time one of the pilots associated with the codebook data transmitted by the user as a pilot.

Alternatively, the user may be pre-allocated one of the pilots associated with the codebook data by the base station, select one of them randomly and transmit it to the base station. According to an embodiment, the base station may transmit the information for this to the user when a pilot associated with the codebook needs to be changed according to the system conditions. If the user generates a pilot through the PG network learned to generate one of pilots associated with the codebook as the pilot, the base station may transmit the information for updating the PG network to the user.

Or, when the user is pre-allocated one of the pilots associated with the codebook data and generates it as the pilot, the base station may transmit the information on the updated pilot to the user.

As shown in FIG. 9, the AUD network has a structure comprising the hidden layers as many as $L^{(g)}$, each of which is composed of six connected layers: 1. dense layer→2. batch normalization→3. activation (ReLU)→4. dense layer→5. batch normalization→6. activation (ReLU). At this time, each hidden layer adopts, as shown in FIG. 8, the residual connection to connect the input of 1. dense layer to the last 6. activation (ReLU) so that the gradient can well be back-propagated.

[Equation 3] expresses a loss function to perform the end-to-end learning of the PG network and the AUD network using the activation vector δ representing the active state of each user and the activation vector $\hat{\delta}$ estimated by the AUD network.

$$\mathcal{L}(\delta, \hat{\delta}) = -\sum_{n=0}^{N-1}\left(\delta_n \log(\hat{\delta}_n) + (1-\delta_n)\log(1-\hat{\delta}_n)\right) \quad \text{[Equation 3]}$$

Furthermore, as shown in FIG. 8, according to this invention, the prior information α for the AUD network can be generated through the UAE network, and it can be used as an input to the AUD network along with $y^{(p)}$ based on the pilot generated in the PG network. Since the AUD network uses the prior information α as an input to detect the active user, the UAE network needs to generate the appropriate prior information α and transmit it to the AUD network.

If the end-to-end learning of the autoencoder is performed using the loss function for δ and $\hat{\delta}$, as shown in [Equation 3], the learning is also possible for the UAE network. However, the UAE network is located so deep in the autoencoder that the gradient for the UAE network may disappear during the learning process through the back-propagation, blocking the effective learning for the UAE network and thus making the UAE network not so useful.

Therefore, for more effective learning of the UAE network, this invention proposes the auto-encoding based on the loss function composed of, as shown in [Equation 4], the active vector $\delta=[\delta_0, \delta_1, \ldots, \delta_{N-1}]^T$ of length N representing the active state of the user and the active user information $\alpha=[\alpha_0, \alpha_1, \ldots, \alpha_{N-1}]^T$ of length N generated through the UAE network.

$$\mathcal{L}(\delta, \alpha) = -\sum_{n=0}^{N-1}(\delta_n \log(\alpha_n) + (1-\delta_n)\log(1-\alpha_n)) \quad \text{[Equation 4]}$$

Through the auto-encoding based on the loss function in [Equation 4], it can optimize the parameters of the UAE network connected to the codebook so that the prior information $\alpha$ of the AUD network generated through the UAE network be close to the information $\delta$ representing the user active state, guaranteeing the minimum performance for the AUD network with this, As shown in FIGS. 6 and 7, a CTU transmitted by one user may include codewords as many as L, and the base station can receive the signals $$\{y_1^{(d)}\}_{l=1}^L$$

from multiple users, as shown in [Equation 2], in which above-mentioned codewords are overlapped. Even if two codebooks are used at the same time in the codebook-based grant-free multiple access, the receiving end can distinguish the codebooks of the two users if the codebooks come through different channels. Therefore, when a codebook and a channel are combined together, the user's data can contain the information about the user's unique index. Therefore, in the codebook-based grant-free multiple access, non-orthogonally overlapping signals are containing the user activation information. Thus, this invention uses not only the pilot but also the user transmission data or the codeword information in the codebook allocated to the user in order to improve the AUD performance. It propose a method to generate the prior information for detecting active users by utilizing the codewords as many as 1~L in the CTU through the UAE network and passing it as the input of the AUD network. The UAE network h($\cdot$) takes the user's multiplexed data $$\{y_1^{(d)}\}_{l=1}^L$$

as its input and the prior information vector $\alpha$ for each user's index as its output, It can be defined as $$h\left(\{y_1^{(d)}\}_{l=1}^L\right) = \alpha.$$

FIG. 10 is a diagram showing an example of the UAE network structure according to an embodiment of this invention.

More specifically, FIG. 10 shows a structure in which the UAE network can extract prior information $\alpha$ of length N determined according to user activation from received data $$\{y_1^{(d)}\}_{l=1}^L.$$

Referring to FIG. 10, the proposed UAE network independently passes two 1-dimensional convolutional layers for the L codeword data, and then combines the L pieces of information extracted through several dense layers. The proposed UAE network structure can largely be composed of two structural features. The first is to independently conduct the convolution processes for L pieces of codeword data, that is, to independently perform the convolution twice for different codewords to create a structure that effectively extracts the information while minimizing the learning parameters. The second is to create the minimum depth required for the network so that it can be generalized to various complex situations by placing multiple dense layers after convolution.

The reason for performing the 1-dimensional convolution layer independently for the L codewords is that any of the equivalent M codewords in the codebook randomly selected according to each of L codeword data transmissions has the same information. For example, when the active users as many as $N_a$ sends M-ary codewords, there can be as many codeword combinations as $M^{N_a}$ at the resource where the l-th codeword is overlapped. At this time, both for the l-th overlapping codeword $$y_1^{(d)}$$

and the (l+1)-th overlapping codeword $$y_{l+1}^{(d)}$$

with the same transmission probability, any of possible $M^{N_a}$ codeword combinations is selected. Since the l-th and (l+1)-th ones can have completely different overlapping codewords each time, the number of possible combination for the two consecutive overlapping user data becomes $(M^{N_a})^2$. However, since $$y_1^{(d)} \text{ and } y_{l+1}^{(d)}$$

contain the same user activation information, the amount of learning can be reduced by processing them independently and then combining them. In other words, if any consecutive data L' are considered together for the activation estimation, the number of cases for the received data to be considered in the same activation increases exponentially as many as $(M^{N_a})^{L'}$. To solve this problem, the activation information can be independently extracted from each L pieces of data $$\{y_1^{(d)}\}_{l=1}^L,$$

and then combine them. Therefore, after passing the kernels of size $(1,2K^{(d)})$ as many as $$N_{kernel}^{(1)}$$

in the first convolution as shown in FIG. 10, it can pass the second kernels of size $$\left(1, N_{kernel}^{(1)}\right)$$

as many as $$N_{kernel}^{(2)}$$

to appropriately adjust the number of learning parameters to be processed with the dense layer. Finally, the activation information from each L pieces of overlapping codeword data extracted through the 2 convolutional layers is again put into a hidden layer of {1. dense layer→2. batch normalization→3. Activation (ReLU)} and combine it in the $L^{(h)}$ deep neural networks (DNNs). For reference, even if the UAE network has already been trained through [Equation 4], it is better to keep the number of dense layers $L^{(h)}$ small as far as it performs, because the UAE network is located deep in the autoencoder, After passing all convolution layers and dense layers, it may pass the batch normalization layer and the ReLU activation layer in order. The batch normalization layer can help it converge quickly by normalizing the means and variances for each learning batch. In addition, since it is a very deep network composed of connections between the UAE network and the AUD network in the proposed autoencoder, the ReLU activation can be used to solve the vanishing gradient problem.

According to an embodiment of this invention, if the AUD is performed with the help of a generated with L pieces of data through the UAE network according to the structure and learning method of FIG. 10, the performance gain can be obtained. In addition, according to an embodiment of this invention, the received signal $$\{y_1^{(d)}\}_{l=1}^L$$

itself may not be used as an input of the AUD network, but the specific prior information α generated through the UAE network with the received signal $$\{y_1^{(d)}\}_{l=1}^L$$

can be used as an input to the AUD network. Thus, even when the number of codewords included in the receiving CTU may change, the AUD network utilizing the extraction information can be reused, and therefore the scalability for the data length can be obtained by keeping the complexity of the AUD constant even for the changing data length L.

On the other hand, when performing the end-to-end learning of the autoencoder using the loss function for δ and δ̂ as shown in [Equation 3], effective learning may not be performed for the UAE network. In addition, the autoencoding based on the loss function according to [Equation 4] may not be optimized for the active detection error rate (AER) when the final end-to-end learning of the entire network consisting of the PG network, the UAE network, and the AUD network is performed.

Therefore, this invention proposes, as described through FIG. 5, a two-step learning method in which the prior learning (step 1 learning) for the UAE network is carried out and then the end-to-end learning (step 2 learning) is performed.

In the step 1, the learning for the UAE network can be performed through the autoencoding that minimizes the loss function composed of activity vector δ and active user information α. The loss function for performing the step 1 may be defined as [Equation 4]. And, in the step 2, the learning of end-to-end network including the PG network, the AUD network and the UAE network can be performed through the autoencoding that minimizes the loss function composed of activity vector δ and the estimated activity vector δ̂ estimated by the AUD network. The loss function for performing the step 2 learning may be defined as [Equation 3].

According to various embodiments of this invention, an active user can be detected by using the data of length L transmitted from the user along with the pilot; in this case, the length L of the data to obtain the AUD performance gain required by the system may vary according to various factors such as user's average activation level or channel. Therefore, the base station may inform the user of the value of the data length L for obtaining the AUD performance gain required by the system through the radio resource control (RRC) message or the downlink control information (DCI).

FIG. 11a is a diagram illustrating a method for indicating the data length change according to an embodiment of this invention.

Referring to FIG. 11a, when it needs to change the L value, the user may transmit a request signal requesting the change of L value to the base station. The request signal may be transmitted through, for example, RRC message, uplink control information (UCI), medium access control control element (MAC CE), or indication information included in uplink data. In the case that the number of NACKs received from the base station is too large (e.g., if the number of NACKs received or the ratio of NACKs received is greater than a certain threshold), the user can request the base station to increase the L value through a request signal. Upon receiving a request signal for the change of L value from the user, the base station may inform the user of the changed data length L. In the embodiment of FIG. 11a, the user may directly request the base station of the L value for change along with the request signal; or, when the user requests a change of L value through the request signal, the base station may determine an appropriate L value and informs it to the user.

FIG. 11b is a diagram illustrating another method for indicating the data length change according to an embodiment of this invention.

Referring to FIG. 11b, when it is necessary to change the L value, the base station may change the L value by itself and notify the user of this.

For example, when it is determined that the number of NACKs transmitted by the base station is too large (e.g., if the number of transmitting NACKs or the ratio of transmitting NACKs is greater than a certain threshold), the base station itself may decide to increase the L value and notify the user of this.

The method for changing the L value based on a user's request described in FIG. 11a and the method for changing the L value based on the base station's own determination described in FIG. 11b may be used in combination with each other. That is, when the user thinks that the L value needs to be changed for performance improvement, the user may transmit a request signal requesting a change of L value to the base station, and the base station may change the L value accordingly and notify the user. In addition, even if there is no explicit request signal from the user, the base station may change the L value based on its own judgment and notify the user of this if it is thought that the L value needs to be changed in the user's system.

In FIGS. 12 to 14 below, the methods of detecting the user data of an activated user by utilizing both the pilot and the user data according to various embodiments of this invention. It is assumed that the values in [Table 1] are used for the system parameters for simulation and the parameters for learning of PG network, UAE network, and UAE network.

TABLE 1

| Description | Notation | Value |
|---|---|---|
| Total number of concurrent users | N | 64 |
| Number of codebooks | J | 6 |
| Number of codewords in codebook | M | 4 |
| Length of codeword resource | $K^{(d)}$ | 4 |
| Length of pilot resource | $K^{(p)}$ | 16 |
| Number of codewords included in CTU | L | 4, 8, 16, 32, 64 |
| User Average Active Probability | $\bar{p} = \sum_{n=0}^{N-1} p_n$ | 0.05 or 0.1 |
| Number of first kernels in UAE NETWORK | $N_{kernel}^{(1)}$ | 256 or 512 |
| Number of second kernels in UAE NETWORK | $N_{kernel}^{(2)}$ | 32 or 64 |
| Number of hidden layers in UAE NETWORK | $L^{(h)}$ | 3 |
| Number of hidden layers in UAE NETWORK | $L^{(g)}$ | 10 |
| Learning rate | $\eta$ | 0.01 |
| Training step 1 first Epoch | $T_1$ | 15 |
| Training step 1 second Epoch | $T_2$ | 10 |
| Training step 2 Epoch | $T_3$ | 40 |

FIG. 12 is a diagram illustrating the activity error rate (AER) performance according to data length L.

FIG. 12 shows the performance when the data length L is changed to 4, 8, 16, 32, and 64 while all the users have an average activation probability p̃=0.05. The square, triangle, and circle graphs represent the performance at 10 dB, 15 dB, and 20 dB, respectively. In a specific situation of the system, if the data length L is too small, the prior information for the AUD network cannot be extracted sufficiently, so L must be longer than a certain length. However, if L is too large, the complexity of the UAE network increases. Therefore, it is important to select and learn an appropriate L according to the situation. For example, when p̃=0.05, the appropriate length L=16. If all users have an average activation probability p̃=0.05 in a given system, about L=16 can be the data length that guarantees the appropriate performance.

FIG. 13 is a diagram showing another example of activity error rate (AER) performance according to the data length L.

FIG. 13 shows the AER performance when $$N_{kernel}^{(1)} = 256, N_{kernel}^{(2)} = 32$$

at L=16 and when $$N_{kernel}^{(1)} = 512, N_{kernel}^{(2)} = 64$$

at L=32 while the average activation probability for all users is set as p̃=0.1. In both cases, the AUD may be the same. For reference, when p̃=0.05 as described in FIG. 12, the optimal performance is obtained at the data length L=16. But, in FIG. 13, when p̃=0.1, the performance is much better at L=32(triangle graph) than at L=16 (square graph). That is, the data length L of optimal performance may be different according to the system conditions (p̃). Therefore, as described with reference to FIGS. 11a and 11b, if L is changed according to a given situation, more optimized performance can be obtained systematically.

FIG. 14 is a diagram illustrating the activity error rate (AER) performance according to the network learning method.

FIG. 14 shows the performance according to different learning methods when all users have the average activity probability p̃=0.05.

First, the square graph shows the AER performance when there is no UAE network and therefore the data is not used for active user detection. It can be seen that it has the highest AER value.

The triangle graph shows AER performance when it includes the UAE network but does not perform the 2-step learning of FIG. 5 through the UAE network, which has the fully-connected layer with a similar number of parameters rather than the structure of FIG. 10. In this case, it can be seen that there is a performance gain by the UAE network compared to the square graph but the gain is not large.

The circle graph shows the AER performance when it performs the 2-step learning of FIG. 5 through the UAE network, which has the fully-connected layer with a similar number of parameters rather than the structure of FIG. 10. In this case, it can be seen that there is a performance gain by the 2-step learning method of FIG. 5 and that there is an SNR gain of about 3 dB to achieve AER=$10^{-3}$.

The diamond graph represents the AER performance when it includes the UAE network but does not perform the 2-step learning of FIG. 5 through the UAE network, which has the structure shown in FIG. 10. The performance gain due to the structure of the UAE network shown in FIG. 10 can be confirmed through the diamond graph. Since the UAE network efficiently extracts the user activation information in this case, it can be seen that there is an SNR gain of about 3 dB to achieve AER=$10^{-3}$ than the fully-connected layer of green color.

Finally, the hexagonal graph shows the AER performance when the 2-step learning of FIG. 5 is performed through the UAE network, which has the structure shown in FIG. 10. In this case, it can be seen that there is an SNR gain of about 2 dB to achieve AER=$10^{-3}$ when compared to the case where only one of the 2-step learning method or the proposed UAE network structure is applied, such as the circle graph or the diamond graph.

FIG. 15 is a diagram showing the structure of a user terminal (1400) according to an embodiment of this invention.

Referring to FIG. 15, a user terminal (1400) may include a transceiver unit (1401), a memory (1402), and a processor (1403). However, the components of the user terminal (1400) are not limited to the above examples. For example, the user terminal (1400) may include more or fewer components than the above-mentioned components. Furthermore, the transceiver (1401), the memory (1402), and the processor (1403) may be integrated as a single chip.

According to an embodiment of this invention, the transceiver (1401) may transmit and receive signals to and from the base station (1500). The above-mentioned signal may include the control information and the data. To this end, the transceiver (1401) may include an RF transmitter for up-converting and amplifying the frequency of the transmitted signal, and an RF receiver for low-noise amplifying and down-converting the frequency of the received signal. In addition, the transceiver (1401) may receive a signal through a wireless channel, output the signal to the processor (1403), and transmit the output signal from the processor (1403) through a wireless channel.

According to an embodiment of this invention, the memory (1402) may store the programs and the data necessary for the operation of the user terminal (1400). In addition, the memory (1402) may store the control information or data included in signals transmitted and received by the user terminal (1400). The memory (1402) may consist of storage media such as ROM, RAM, hard disk, CD-ROM, DVD, or their combination. Also, the memory (1402) may be composed of multiple memories.

According to an embodiment of this invention, the processor (1403) may control a series of processes in which the user terminal (1400) may operate according to the above-described embodiments of this invention. In addition, the processor (1403) may include multiple processors and may execute the programs stored in the memory (1402). The processor (1403) may also include a data generator that generates the data based on the codebook or a pilot generator that generates the pilot of the user terminal (1400).

FIG. 16 is a diagram showing the structure of a base station (1500) according to an embodiment of this invention.

Referring to FIG. 16, a base station (1500) may include a transceiver (1501), a memory (1502), and a processor (1503). However, the components of the base station (1500) are not limited to the above examples. For example, the base station (1500) may include more or fewer components than those described above. In addition, the transceiver (1501), the memory (1502), and the processor (1503) may be integrated as a single chip.

According to an embodiment of this invention, the transceiver (1501) may transmit and receive signals to and from the user terminal (1400). The above-mentioned signal may include the control information and the data. To this end, the transceiver (1501) may include an RF transmitter that up-converts and amplifies the frequency of the transmitted signal, and an RF receiver that amplifies the received signal with low noise and down-converts its frequency. In addition, the transceiver (1501) may receive a signal through a wireless channel, output the signal to the processor (1503), and transmit the output signal from the processor (1503) through a wireless channel.

According to an embodiment of this invention, the memory (1502) may store the programs and the data necessary for the operation of the base station. In addition, the memory (1502) may store the control information or data included in signals transmitted and received by the base station (1500). The memory (1502) may consist of storage media such as ROM, RAM, hard disk, CD-ROM, DVD, or their combination. Also, the memory (1502) may be composed of multiple memories.

According to an embodiment of this invention, the processor (1503) may control a series of processes so that the base station (1500) can operate according to the above-described embodiment of this invention. In addition, the processor (1503) may include multiple processors and may execute the programs stored in the memory (1502). The processor (1503) may include an active user information extraction unit to generate the active user information with the received data, an active user detection unit to detect the active users with the received pilots and the active user information, a channel estimation unit to estimate the channel for an active user, and a multi-user detection unit to detect the data received from active users.

According to various embodiments of this invention, it can improve the AUD performance without additional consumption of pilot resources in the grant-free transmission by enabling the information useful for pilot-based AUD procedures to be extracted from the data through the deep learning. In other words, if the same AUD performance is secured, it can use smaller pilot resources to maintain the active user detection (AER) the same by using M-ary codebook data.

In addition, according to various embodiments of this invention, it uses the feed-forward type neural network (NN) rather than the iterative method for the receiver's AUD so as to secure excellent performance with lower complexity and lower processing time without repetition when compared to the method not using the deep learning (e.g., compressive sensing) or the method using the data through repetition.

According to various embodiments of this invention, it can effectively extract the codebook information from the data of different lengths through the User Activity Extraction (UAE) network that extracts the codebook and the channel characteristics, which can be used as the prior information for AUD, thus making the M-ary codebook data be effectively used for AUD. The UAE network can extract the user activity information of a fixed size and use it as the prior information for AUD, enabling the AUD network to effectively utilize the data of different lengths.

According to various embodiments of this invention, when the codebook-based grant-free transmission is used, it can design the pilots considering the codebook assignment by designing the pilots suitable for each codebook through the pilot generation (PG) network. Thus, it can use the pilots with a better performance gain compared to the pilots based on Zadoff-chu sequence that does not consider the codebook assignment.

Methods according to the embodiments described in the claims or specification of this invention may be implemented in the form of hardware, software, or a combination of them.

When it is implemented in the software, a computer-readable storage medium that can store one or more programs (software modules) may be provided. One or more programs stored in the computer-readable storage medium are configured for execution by one or more processors in an electronic device. One or more programs can include the instructions that enable the electronic device to execute the methods according to embodiments described in the claims or specification of this invention.

Such programs (software modules, software) may be stored in random access memory, non-volatile memory including flash memory, read only memory (ROM), and electrically erasable programmable ROM. EEPROM (Electrically Erasable Programmable ROM), magnetic disc storage device, Compact Disc-ROM (CD-ROM), Digital Versatile Discs (DVDs) or other optical storage devices, magnetic cassettes or any memory composed of a combination of some or all above memories. And, each of these may included multiple memories.

In addition, the programs may be stored in the attachable storage device that can be accessed through the Internet, Intranet, Local Area Network (LAN), Wide LAN (WLAN), Storage Area Network (SAN), or an integrated communication network composed of above ones. Such storage devices may be connected to the device performing an embodiment of this invention through an external port. Furthermore, a separate storage device on a communication network may be connected to the device performing an embodiment of this invention.

In the specific embodiments of this invention described above, the components included in the invention have been expressed in singular or plural forms according to the specific embodiment. However, such singular or plural expressions are selected just for the convenience of explanation, and this invention is not limited to singular or plural components. Even if the components expressed in plural may be composed of one or a single unit, and the components expressed in singular may be composed of multiple ones.

In addition, the embodiments of this invention in the above specifications and drawings are only presented as plausible examples to easily explain the technical contents of this invention, helping understand this invention, and are not intended to limit the scope of this invention. Thus, it will be obvious to the people with ordinary knowledge in the technical field of this invention that other modification examples based on the technical idea of this invention are also plausible. Furthermore, above embodiments can be combined with each other, if necessary, for additional implementations. For example, some parts of an embodiment of this invention and of its another embodiment may be combined with each other to operate a base station and a terminal.

Furthermore, the order of explanations in the drawings describing the method of this invention does not necessarily correspond to that of execution; the order of procedures may be changed or executed in parallel.

The drawings describing the method of this invention may omit some of the elements but include only some of them within the range of not impairing the essence of this invention.

In addition, the methods of this invention may be implemented by combining some or all of the contents in other embodiments within the range of not impairing the essence of this invention.

Various embodiments of the invention have been described above. The foregoing descriptions of this invention are for illustrative purposes, and the embodiments of this invention are not limited to the disclosed ones. The people with ordinary knowledge in the technical field of this invention will understand that it can be easily modified into other specific forms without changing the technical spirit or essential characteristics of this invention. The scope of this invention is indicated by the following claims rather than the descriptions above. And it should be interpreted that all changes or modifications derived from the meaning and scope of the claims and equivalent concepts are included in the scope of this invention.

EXPLANATION OF CODES

1400: user terminal
1401: transceiver
1402: memory
1403: processor
1500: base station
1501: transceiver
1502: memory
1503: processor

The invention claimed is:

1. A method performed by a base station in a wireless communication system, comprising:

transmitting a codebook allocated for data transmission to each of multiple user terminals;

receiving a pilot and data from one or more user terminals among the multiple user terminals;

generating active user information based on the data received from the one or more user terminals;

detecting an active user terminal among the multiple user terminals based on the pilot and the active user information;

generating channel estimation information related to the active user terminal; and detecting the data of the active user terminal based on the channel estimation information, wherein the method further comprises transmitting information indicating a length of the data to the one or more user terminals, and wherein transmitting the information indicating the length of the data comprises either transmitting the information indicating the length of the data in response to a data length change request received from the one or more user terminals or transmitting the information indicating the length of the data when a pre-set condition is satisfied.

2. The method of claim 1, wherein the data is received through codeword transmitted based on the codebook assigned to each of the one or more user terminals, and wherein the pilot received from the one or more user terminals is either (i) a pilot randomly selected by the user terminal from among multiple pilot sequences generated in advance by the base station and allocated for the transmission in association with codebooks for multiple user terminals, or (ii) a pilot generated in real time to be associated with a codebook allocated to each of the one or more user terminals through a pilot generation unit of the user terminal.

3. The method of claim 2, further comprising transmitting a signal to the one or more user terminals to update the pilot generation unit, wherein, after transmitting the signal, the pilot is generated in real time via an updated pilot generation unit of the one or more user terminals.

4. The method of claim 1, wherein the active user information is generated using a neural network, the neural network being trained with a first learning step and a second learning step wherein the wherein the first learning step uses a first loss function defined based on information indicating activation states of the multiple user terminals and the active user information, and wherein the second learning step uses a second loss function defined based information on the indicating activation states of the multiple user terminals and the information indicating estimated activation states of the multiple user terminals.

5. A method performed by a user terminal in a wireless communication system, comprising:

receiving a codebook allocated for data transmission from a base station;

generating data based on the codebook;

selecting or generating a pilot; and transmitting the pilot and the data to the base station, wherein the user terminal is detected as an active user terminal among multiple user terminals based on the pilot and active user information generated based on the data, wherein the method further comprises receiving information indicating a length of the data from the base station, and wherein receiving the information indicating the length of the data comprises either receiving the information indicating the length of the data from the base station in response to a data length change request sent from the user terminal or receiving the information indicating the length of the data when a pre-set condition is satisfied.

6. The method of claim 5, wherein the pilot is either (i) a pilot selected by the user terminal from among multiple pilot sequences generated in advance by the base station for allocation to multiple user terminals, or (ii) a pilot generated in real time by a pilot generation unit of the user terminal in association with the codebook allocated to the user terminal.

7. The method of claim 6, further comprising receiving a signal from the base station to update the pilot generation unit, wherein, upon receiving the signal, the pilot is generated in real time through an updated pilot generation unit of the user terminal.

8. The method of claim 5, wherein active user information is generated at the base station using a neural network, the neural network being trained with a first learning step and a second learning step, wherein the first learning step uses a first loss function defined based on information indicating activation states of a plurality of user terminals and the active user information, and wherein the second learning step uses a second loss function defined based on information indicating activation states of the plurality of user terminals and information indicating estimated activation states of the plurality of user terminals.

9. A wireless communication system, comprising:

a base station including a transceiver and one or more processors operatively connected to the transceiver; and a user terminal including a transceiver and one or more processors operatively connected to the transceiver;

wherein the one or more processors of the base station are configured to:

transmit a codebook allocated for data transmission to each of a plurality of user terminals, receive a pilot and data from one or more user terminals among the plurality of user terminals, generate active user information based on the data, detect an active user terminal among the plurality of user terminals based on the pilot and the active user information, generate channel estimation information related to the active user terminal, and detect the data of the active user terminal based on the channel estimation information, wherein the one or more processors of the base station are further configured to transmit information indicating a length of the data to the one or more user terminals, and wherein transmitting the information indicating the length of the data comprises either transmitting the information indicating the length of the data based on a data length change request received from the one or more user terminals or transmitting the information indicating the length of the data when a pre-set condition is satisfied.

10. The base station of claim 9, wherein the data is received through a codeword transmitted based on the codebook assigned to each of the one or more user terminals, and wherein the pilot received from the one or more user terminals is either (i) a pilot randomly selected by the user terminal from among multiple pilot sequences generated in advance by the base station and allocated for transmissions associated with codebooks for multiple user terminals, or (ii) a pilot generated in real time via a pilot generation unit of the user terminal in association with the codebook allocated to the user terminal.

11. The base station of claim 10, wherein the one or more processors are configured to transmit a signal to the one or more user terminals to update the pilot generation unit, and wherein, when the signal is transmitted, the pilot is generated in real time through an updated pilot generation unit of the user terminal.

12. The base station of claim 9, wherein the one or more processors are configured to generate the active user information based on a neural network that is trained with the a first learning step and a second learning step, wherein the first learning step uses a first loss function defined based on information indicating activation states of the plurality of user terminals and the active user information, and wherein the second learning step uses a second loss function defined based on information indicating activation states of the plurality of user terminals and the information indicating estimated activation states of the plurality of user terminals.

13. The user terminal of claim 9, wherein the one or more processors of the user terminal are configured to:

receive a codebook allocated for data transmission from the base station;

generate data based on the codebook:

select or generate a pilot; and transmit the pilot and the data to the base station, and wherein the one or more processors of the user terminal are configured to receive information indicating a length of the data from the base station, and wherein receiving the information indicating the length of the data comprises either receiving the information indicating the length of the data from the base station in response to a data length change request transmitted from the user terminal or receiving the information indicating the length of the data when a pre-set condition is satisfied.

14. The user terminal of claim 13, wherein the data is transmitted through a codeword based on the codebook allocated to the user terminal, and wherein the pilot is either (i) a pilot selected by the user terminal from among multiple pilot sequences generated in advance by the base station for allocation to multiple user terminals, or (ii) a pilot generated in real time by a pilot generation unit of the user terminal in association with the codebook allocated to the user terminal.

15. The user terminal of claim 14, wherein the one or more processors of the user terminal are configured to receive a signal from the base station to update the pilot generation unit, and wherein, upon receiving the signal, the pilot is generated in real time through an updated pilot generation unit of the user terminal.

16. The user terminal of claim 13, wherein the user terminal is detectable as an active user terminal among the plurality of user terminals based on a neural network that is trained with a first learning step and a second learning step, wherein the first learning step uses a first loss function defined based on information indicating activation states of the plurality of user terminals and the active user information, and wherein the second learning step uses a second loss function defined based on information indicating activation states of the plurality of user terminals and information indicating estimated activation states of the plurality of user terminals.

* * * * *